US012704605B2

(12) United States Patent
Yang et al.

(10) Patent No.: US 12,704,605 B2
(45) Date of Patent: Aug. 11, 2026

(54) LIDAR AND AUTONOMOUS DRIVING VEHICLE

(71) Applicant: SUTENG INNOVATION TECHNOLOGY CO., LTD., Shenzhen (CN)

(72) Inventors: Di Yang, Shenzhen (CN); Pan Lu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 952 days.

(21) Appl. No.: 17/980,504

(22) Filed: Nov. 3, 2022

(65) Prior Publication Data

US 2023/0048902 A1 Feb. 16, 2023

Related U.S. Application Data

(63) Continuation of application No. PCT/CN2020/089038, filed on May 7, 2020.

(51) Int. Cl.
*G01S 7/481* (2006.01)
*G01S 17/931* (2020.01)

(52) U.S. Cl.
CPC .......... *G01S 7/4817* (2013.01); *G01S 17/931* (2020.01)

(58) Field of Classification Search
CPC ............................ G01S 7/4815; G01S 7/4817
See application file for complete search history.

(56) References Cited

U.S. PATENT DOCUMENTS 5,268,565 A * 12/1993 Katoh ...................... G02B 5/09 235/462.31
2005/0219504 A1* 10/2005 Adachi ................ G01S 7/4813 356/5.03

FOREIGN PATENT DOCUMENTS

CN 102736075 A 10/2012
CN 108445467 A 8/2018
CN 108614254 A 10/2018

OTHER PUBLICATIONS

International search report and written opinion issued in corresponding International Application No. PCT/CN2020/089038, mailed Feb. 8, 2021, 9 pages.
First Office Action of the Chinese application No. 202080004643.7, issued on Apr. 3, 2025. 9 pages.

* cited by examiner

*Primary Examiner* — Thanh Luu
(74) *Attorney, Agent, or Firm* — BAYES PLLC

(57) ABSTRACT

The present application discloses a LiDAR and an autonomous driving vehicle. The LiDAR includes a rotary device, a laser transceiving assembly, and a reflecting assembly. The rotary device has a first rotary part and a second rotary part that are configured to rotate relative to each other around a rotary axis. The laser transceiving assembly is connected to the first rotary part and configured to emit an emergent laser beam and receive a reflected laser beam. The reflecting assembly is connected to the second rotary part and has at least two reflectors. The at least two reflectors are arranged around the rotary axis, and at least two of included angles between the reflectors and a plane perpendicular to the rotary axis are different. In the present application, the same reflector can reflect both the emergent laser beam and the reflected laser beam.

17 Claims, 22 Drawing Sheets

LIDAR AND AUTONOMOUS DRIVING VEHICLE

CROSS-REFERENCE TO RELATED APPLICATION

The present application is a continuation of International Application No. PCT/CN2020/089038, filed on May 7, 2020, the content of which is incorporated herein by reference in its entirety.

TECHNICAL FIELD

The present application relates to the technical field of laser detection, and in particular to a LiDAR and an autonomous driving vehicle.

BACKGROUND

A LiDAR is a radar system for detecting position, speed, and other characteristic parameters of an object by emitting laser beams. The working principle of LiDAR is that an emitting system firstly emits emergent laser beams for detection to a detection area, then a receiving system receives reflected laser beams reflected back by the object in the detection area. The reflected laser beams are compared with the emergent laser beams, and relevant information of the object, such as parameters of distance, direction, height, speed, attitude, and even shape, can be obtained after processing.

The existing LiDAR includes a laser emitting apparatus, a laser receiving apparatus, and a reflector. The reflector can rotate relative to a rotary axis, the emergent laser beam emitted by the laser emitting apparatus is emitted outwards to scan through the rotating reflector, and meanwhile, the reflected laser beam is received by the rotating reflector and is emitted to the laser receiving apparatus, so that the LiDAR can realize detection. The existing LiDAR can realize detection through the rotation of a reflector, but has limited detection field of view and poor detection resolution.

SUMMARY

The present application provides a LiDAR and an autonomous driving vehicle, and the LiDAR and the autonomous driving vehicle can obtain a wider detection field of view.

According to an aspect of the present application, a LiDAR is provided, including:

- a rotary device, including a first rotary part and a second rotary part, wherein the first rotary part and the second rotary part can rotate relative to each other around a rotary axis;
- a laser transceiving assembly, connected to the first rotary part and configured to emit an emergent laser beam and receive a reflected laser beam, wherein the reflected laser beam is a laser beam reflected back after the emergent laser beam irradiating an object to be detected; and
- a reflecting assembly, connected to the second rotary part and including at least two reflectors, wherein the at least two reflectors are arranged around the rotary axis, and at least two of included angles between the at least two reflectors and a plane perpendicular to the rotary axis are different;
- wherein each reflector is configured to reflect the emergent laser beam emitted by the laser transceiving assembly to the object and reflect the reflected laser beam reflected back by the object to the corresponding laser transceiving assembly.

In some embodiments, every two adjacent reflectors are connected to each other along a circumferential direction around the rotary axis.

In some embodiments, the second rotary part has a rotation motion rotating relative to the first rotary part, and the rotation stroke is 360 degrees.

In some embodiments, a number of the reflectors is at least three, and the reflectors are connected to each other to form an annular reflector set.

In some embodiments, the included angles between the at least two reflectors and the plane perpendicular to the rotary axis are all different.

In some embodiments, the reflectors comprise an initial reflector and an end reflector adjacent to the initial reflector, and included angles between the reflectors and the plane perpendicular to the rotary axis gradually increase from the initial reflector to the end reflector along the circumferential direction around the rotary axis.

In some embodiments, an included angle between every two adjacent reflectors is equal from the initial reflector to the end reflector along the circumferential direction around the rotary axis.

In some embodiments, a minimum value of the included angles between the reflectors and the rotary axis is greater than 0 degrees, and a maximum value of the included angles between the reflectors and the rotary axis is less than 90 degrees.

In some embodiments, the LiDAR comprises a plurality of the laser transceiving assemblies, and the plurality of the laser transceiving assemblies are arranged around the rotary axis;

in the rotation motion of the second rotary part, the emergent laser beam emitted by each laser transceiving assembly can be reflected by at least one of the reflectors, and at least one of the reflected laser beams reflected back by the reflectors can be received by each laser transceiving assembly.

In some embodiments, the number of the laser transceiving assemblies is the same as the number of the reflectors, and in the rotation motion of the second rotary part, each reflector reflects one of the emergent laser beams of the laser transceiving assemblies correspondingly, and reflects one of the reflected laser beams to the corresponding laser transceiving assembly.

In some embodiments, a fixing structure is arranged on the first rotary part and is configured to fix the LiDAR.

In some embodiments, the first rotary part comprises:

- a base, wherein the fixing structure is arranged on the base, the base includes a mounting surface, and the laser transceiving assembly is mounted on the mounting surface; and
- a supporting shaft, wherein the supporting shaft is connected to the mounting surface, a central axis of the supporting shaft is perpendicular to the mounting surface, the second rotary part is connected to an end portion of the supporting shaft facing away from the first rotary part, and the rotary axis is parallel to or coincident with the central axis of the supporting shaft;
- wherein an included angle $\theta$ between an optical axis of each laser transceiving assembly and each reflector has the following value range: $0° < \theta < 90°$.

In some embodiments, the second rotary part also comprises:

- a bottom shell, wherein the bottom shell is connected to the base, and defines, together with a surface of the base facing away from the mounting surface, a containing cavity, the containing cavity is configured to contain a circuit board of the LiDAR, and the circuit board is electrically connected with the laser transceiving assembly.

In some embodiments, the base comprises an outer shell and a bottom plate, the outer shell is arranged around the periphery of the bottom plate, and the outer shell, the bottom plate, and the bottom shell jointly define the containing cavity;

the bottom plate comprises the mounting surface, a through hole penetrating through the bottom plate is formed in the mounting surface, and the laser transceiving assembly is electrically connected with the circuit board through the through hole.

In some embodiments, the LiDAR comprises a plurality of the laser transceiving assemblies arranged around the rotary axis;

a plurality of the through holes are formed in the base plate, and each laser transceiving assembly is electrically connected with the circuit board through the through holes in a one-to-one correspondence manner.

In some embodiments, the second rotary part comprises a rotary table, and the rotary table is connected to an end portion of the supporting shaft facing away from the base;

the rotary table comprises a reflecting surface, and the reflectors are connected to the reflecting surface.

In some embodiments, the rotary table comprises a plurality of the reflecting surfaces arranged around the supporting shaft;

the reflecting assembly comprises a plurality of the reflectors, each reflector being connected to each reflecting surface in a one-to-one correspondence manner.

In some embodiments, the LiDAR also comprises:

a driving apparatus, connected to the first rotary part and the second rotary part and configured to drive the second rotary part to rotate around the rotary axis relative to the first rotary part.

A second aspect of the present application provides an autonomous driving vehicle comprising the LiDAR of any of the above.

For the LiDAR provided herein, on the one hand, because the reflecting assembly can rotate relative to the laser transceiving assemblies, each laser transceiving assembly forms a field of view covering a certain angle in a direction perpendicular to the rotary axis, and on the other hand, the reflecting assembly in the embodiment has at least two reflectors having different included angles between the reflectors and a plane perpendicular to the rotary axis, therefore the detection fields of view of the laser transceiving assemblies formed relative to the reflectors having different included angles stagger in a direction parallel to the rotary axis, and then at least two detection fields of view formed by the LiDAR stagger in a direction parallel to the rotary axis. Compare with a single detection field of view in the prior art, the field of view of the LiDAR provided herein is wider; the at least two detection fields of view formed by the LiDAR can also partly overlap, and thus the overlapped fields of view have a higher detection precision.

BRIEF DESCRIPTION OF DRAWINGS

In order to more clearly illustrate embodiments of the present application or the technical solutions in the prior art, the drawings used in the embodiments or related art will be briefly described below. It is obvious that the drawings in the description below are only some embodiments of the present application, and other drawings can be derived from these drawings by those skilled in the art without making creative efforts.

DETAILED DESCRIPTION

Figure 1:
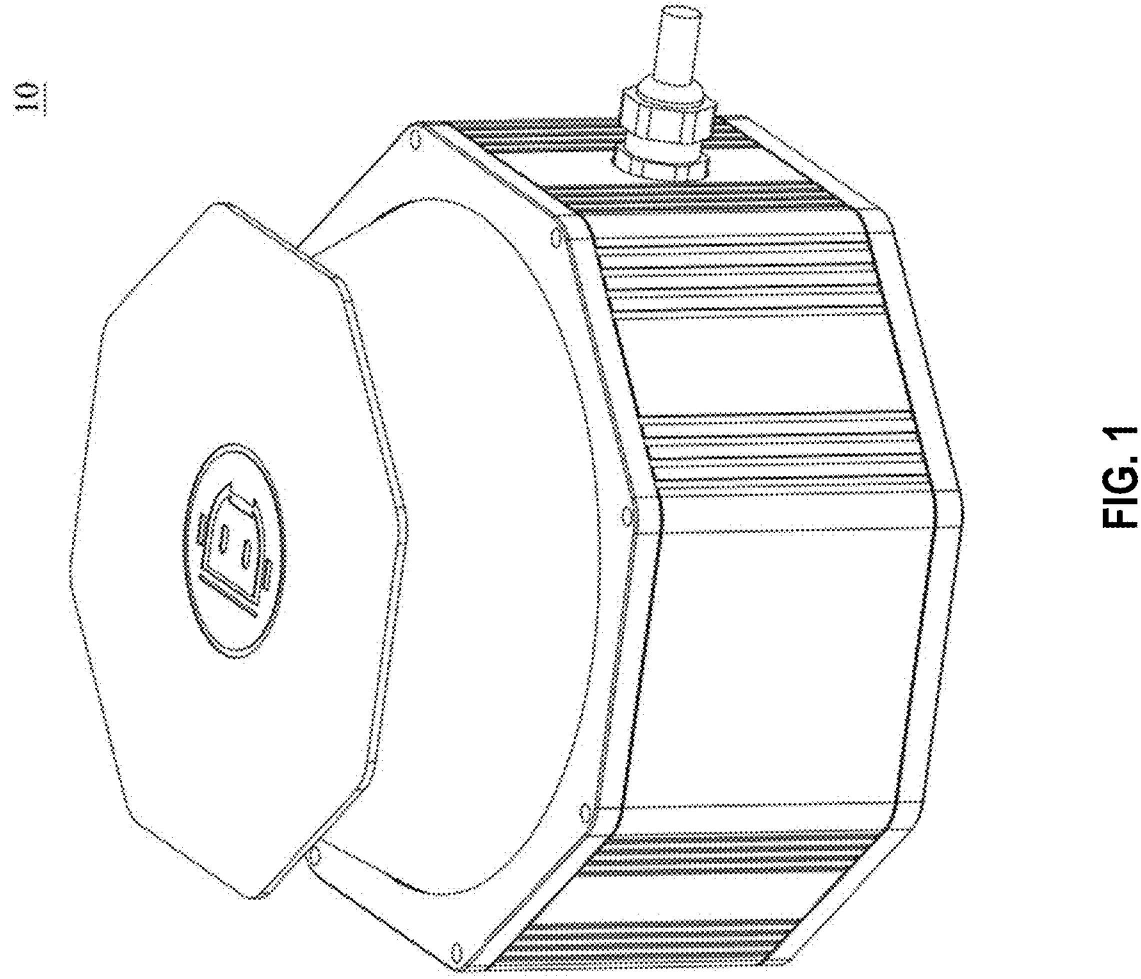
FIG. 1 is a schematic perspective diagram of a LiDAR according to an embodiment of the present application.

In order to make the objectives, technical solutions, and advantages of the present application more apparent, the present application is further described in detail below with reference to the accompanying drawings and embodiments. It should be understood that the embodiments described herein are merely illustrative of the present application and do not limit the present application.

A LiDAR is a radar system for detecting position, speed, and other characteristic parameters of an object by emitting laser beams. The working principle of LiDAR is that an emitting system firstly emits emergent laser beams for detection to a detection area, then a receiving system receives reflected laser beams reflected back by the object in the detection area. The reflected laser beams are compared with the emergent laser beams, and relevant information of the object, such as parameters of distance, direction, height, speed, attitude, and even shape, can be obtained after processing.

The existing LiDAR comprises a laser emitting apparatus, a laser receiving apparatus, and a reflector. The reflector can rotate relative to a rotary axis, the emergent laser beam emitted by the laser emitting apparatus is emitted outwards to scan through the rotating reflector, and meanwhile, the reflected laser beam is received by the rotating reflector and is emitted to the laser receiving apparatus, so that the LiDAR can realize detection. The existing LiDAR can realize detection through the rotation of a reflector, but has limited detection field of view and poor detection resolution.

As shown in FIGS. 1 to 12, the present embodiment provides a LiDAR 10. The LiDAR 10 has a wider detection field of view than that of the prior art. The LiDAR 10 includes a rotary device, a laser transceiving assembly 300, and a reflecting assembly 400.

The rotary device includes a first rotary part 100 and a second rotary part 200. The first rotary part 100 and the second rotary part 200 can rotate relative to each other, and both of them rotate around a rotary axis 20. That is, when the first rotary part 100 is stationary and the second rotary part 200 rotates, the second rotary part 200 rotates around the rotary axis 20. Similarly, when the second rotary part 200 is stationary and the first rotary part 100 rotates, the first rotary part 100 rotates around the rotary axis 20. The first rotary part 100 and the second rotary part 200 can also simultaneously rotate around the rotary axis 20 (in this case, the external reference, such as the earth, can be considered as a stationary object).

In an embodiment, the first rotary part 100 and the second rotary part 200 can be located on two sides of the LiDAR 10. In this case, both parts can rotate independently or simultaneously. When both parts rotate simultaneously, the LiDAR 10 may also include a supporting member connected to both the first rotary part 100 and the second rotary part 200, and the first rotary part 100 and the second rotary part 200 rotate around the rotary axis 20 relative to the supporting member simultaneously.

In some embodiments, when one of the first rotary part 100 and the second rotary part 200 rotates around the other, for example, when the first rotary part 100 is stationary and the second rotary part 200 rotates around the rotary axis 20 relative to the first rotary part 100, the second rotary part 200 may be arranged inside the first rotary part 100. For example, the first rotary part 100 may include an outer shell of the LiDAR 10, and the second rotary part 200 is arranged inside the outer shell and is rotatable around the rotary axis 20 inside the first rotary part 100. Similarly, when the second rotary part 200 is stationary and the first rotary part 100 rotates around the rotary axis 20 relative to the second rotary part 200, the first rotary part 100 may be arranged inside the second rotary part 200. For example, the second rotary part 200 may include an outer shell of the LiDAR 10, and the first rotary part 100 is arranged inside the outer shell and is rotatable around the rotary axis 20 inside the second rotary part 200. Similarly, when both the first rotary part 100 and the second rotary part 200 rotate relative to the external reference, the LiDAR 10 may also include an outer shell (in this case, the outer shell is neither a portion of the first rotary part 100, nor a portion of the second rotary part 200), and both the first rotary part 100 and the second rotary part 200 may be arranged inside the outer shell, and the outer shell is configured to be fixedly mounted with an external component (for example, when the LiDAR 10 is mounted on a vehicle, the outer shell of the LiDAR 10 is connected with the vehicle and is stationary relative to the vehicle).

In some embodiments, as shown in FIGS. 2, 3, 4, and 14, the first rotary part 100 includes an outer shell 112, and the second rotary part 200 is arranged inside the outer shell 112 and is rotatable inside the outer shell 112.

The laser transceiving assembly 300 includes a laser emitting apparatus 310 and a laser receiving apparatus 320. The laser emitting apparatus 310 can emit an emergent laser beam for detection, and the emergent laser beam is configured to irradiate an object to be detected. The emergent laser beam is reflected by the object to be detected to form a reflected laser beam, and the laser receiving apparatus 320 is configured to receive the reflected laser beam. The laser emitting apparatus 310 and the laser receiving apparatus 320 may be integrated into a module, or they may be two independent components. In some embodiments, the laser transceiving assembly 300 is connected to the first rotary part 100, and is rotatable with the rotation of the first rotary part 100. For the convenience of description, in the present application, the light emitted from the laser emitting apparatus 310 and irradiated to the object to be detected is referred to as the emergent laser beam, and the light emitted from the laser emitting apparatus 310 becomes an emergent laser beam regardless of whether the light is subjected to other reflection processes before being irradiated to the object to be detected. The light reflected by the object to be detected and transmitted to the laser receiving apparatus 320 is referred to as the reflected laser beam, and the light reflected by the object to be detected becomes the reflected laser beam regardless of whether the light is subjected to other reflection processes before being received by the laser receiving apparatus 320.

As shown in FIGS. 13 to 20, the present embodiment also provides a laser transceiving assembly 300 of the LiDAR 10, and the laser emitting apparatus 310 and the laser receiving apparatus 320 in the laser transceiving assembly 300 are combined into a module. In some embodiments, the laser transceiving assembly 300 includes a laser emitting apparatus 310, a laser receiving apparatus 320, and a transceiving shell 330. The transceiving shell 330 is connected to the laser emitting apparatus 310 and the laser receiving apparatus 320.

The transceiving shell 330 may define a laser receiving passage 334 and a laser emitting passage 333, and the emergent laser emitted by the laser emitting apparatus 310 irradiates the object to be detected by passing through the laser emitting passage 333. The reflected laser reflected back by the object to be detected passes through the laser receiving passage 334 and irradiates the laser receiving apparatus 320. The passage axis of the laser emitting passage 333 (i.e., the central axis extending along the length direction of laser emitting passage 333) and the passage axis of the laser receiving passage 334 (i.e., the central axis extending along the length direction of the laser receiving passage 334) intersect or are parallel. In order to facilitate machining and tuning of the optical path, in some embodiments, the passage axis of the laser emitting passage 333 is arranged in parallel with the passage axis of the laser receiving passage 334.

Figure 15:
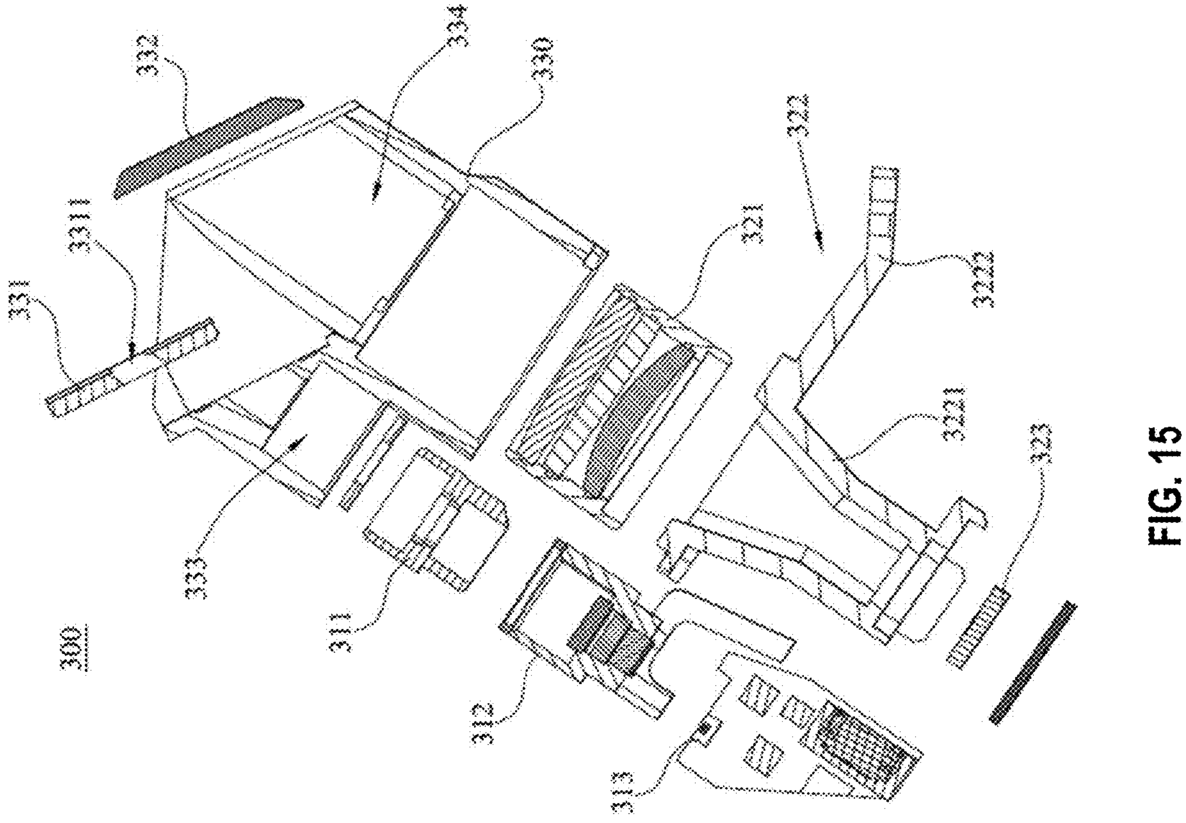
FIG. 15 is a schematic full-sectional diagram of a laser transceiving assembly according to an embodiment of the present application, where the laser transceiving assembly is shown exploded.
Figure 16:
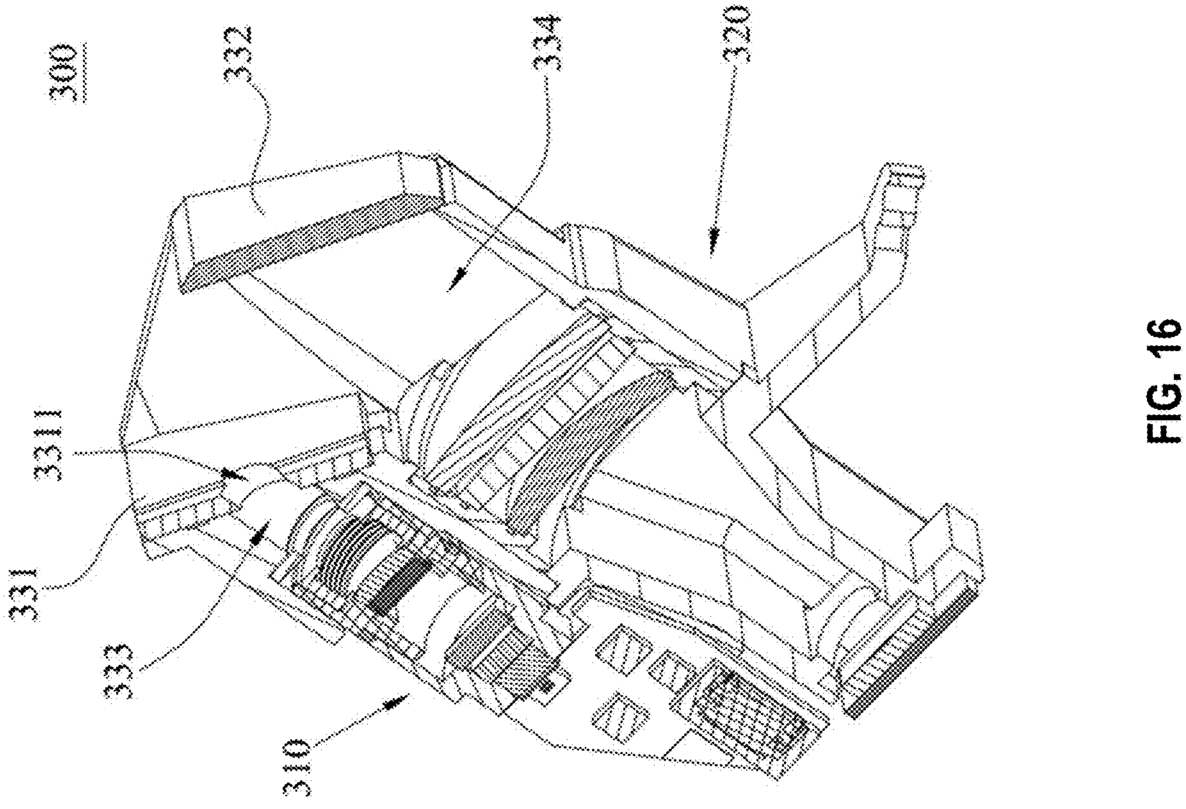
FIG. 16 is a schematic perspective diagram of a laser transceiving assembly according to an embodiment of the present application, where the laser transceiving assembly is shown exploded.
Figure 17:
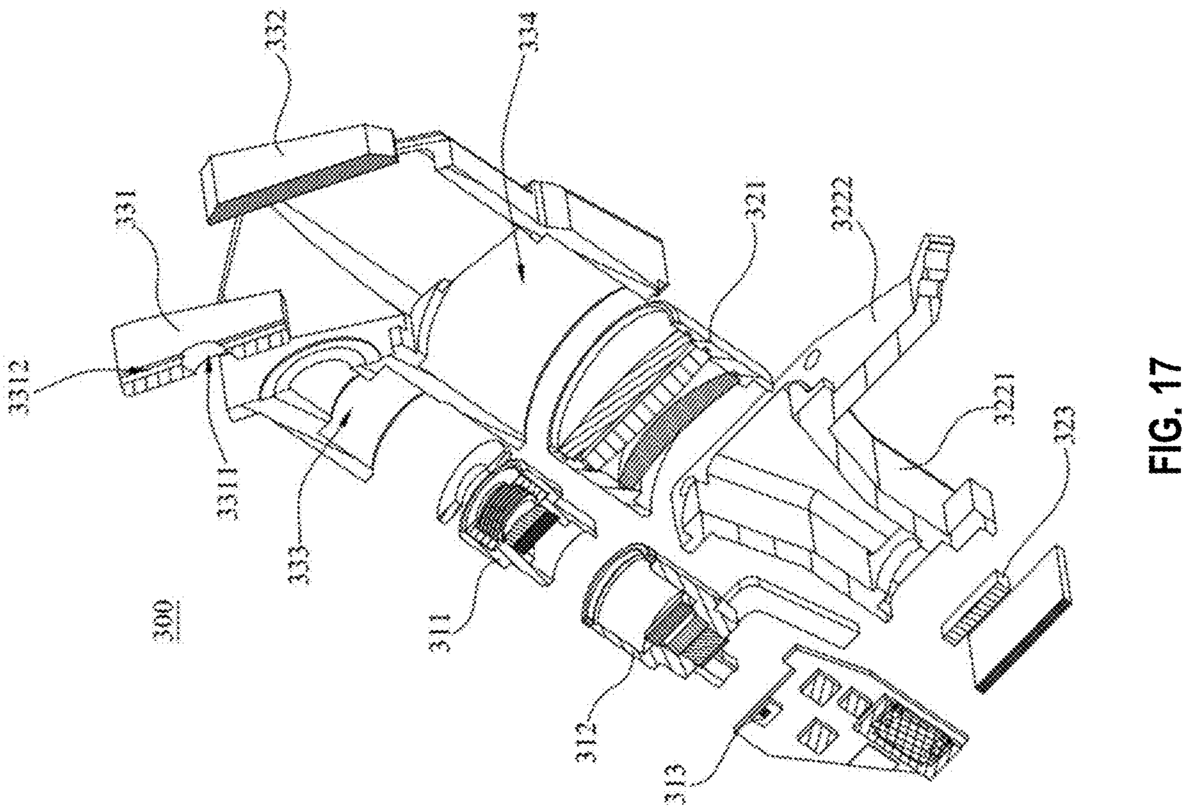
FIG. 17 is a schematic exploded diagram of the laser transceiving assembly of FIG. 16.

As shown in FIGS. 15 to 17, in some embodiments, the transceiving shell 330 includes an outer shell, a first reflector 331, and a second reflector 332. The outer shell defines the aforementioned laser emitting passage 333 and the laser receiving passage 334. The first reflector 331 is arranged in the laser emitting passage 333, a beam passing hole 3311 is formed in the first reflector 331, and the beam passing hole 3311 is configured to pass the emergent laser beam. The first reflector 331 is configured to reflect the reflected laser beam to the second reflector 332. The second reflector 332 is arranged in the laser receiving passage 334, and the second reflector 332 is configured to reflect the reflected laser beam reflected back by the first reflector 331 to the laser receiving component 323. That is, the surface of the first reflector 331 faces away from the laser emitting apparatus 310, and the surface of the second reflector 332 faces the laser receiving apparatus 320. The emergent laser beam emitted by the laser emitting apparatus 310 passes through the beam passing hole 3311 of the first reflector 331 and then irradiates the object to be detected, the reflected laser beam reflected back by the object to be detected irradiates the surface of the first reflector 331 and then is reflected by the first reflector 331 to the surface of the second reflector 332 located in the laser receiving passage 334, and the reflected laser beam reflected by the second reflector 332 passes through the laser receiving passage 334 and irradiates the laser receiving apparatus 320. The above structure enables both the emergent laser beam and the reflected laser beam to be emitted or received by the same opening (i.e., an opening of the beam emitting passage 333), which facilitates the adjustment of the laser path on the one hand, and also enables the relative layout positions of the laser receiving apparatus 320 and the laser emitting apparatus 310 to be more flexible on the other hand. When the relative positions of the laser receiving apparatus 320 and the laser emitting apparatus 310 are changed, the position changes of the laser receiving apparatus 320 and the laser emitting apparatus 310 can be compensated by only adjusting the relative distance and the relative angle between the first reflector 331 and the second reflector 332. In addition, the laser transceiving assemblies emit or receive laser beams from the same opening (namely the laser transceiving assemblies emit and receive laser beams coaxially), and because only reflected laser incident at a specific angle is received, stray light (including ambient light and light of other radars and light sources) can be received as little as possible, thereby increasing the signal-to-noise ratio and improving the detection efficiency.

In other embodiments, the transceiving shell 330 may also have two independent passages, one for transmitting the emergent laser and the other for receiving the reflected laser beam, without the crosstalk between the light in the two passages.

As shown in FIG. 17, the laser emitting apparatus 310 includes a first emitting lens set 312, a second emitting lens set 311, and a laser emitting component 313. The laser emitting component 313 is connected to the first emitting lens set 312. The emergent laser beam emitted by the laser emitting component 313 sequentially passes through the first emitting lens set 312 and the second emitting lens set 311. The second emitting lens set 311 is connected with the first emitting lens set 312 and configured to be movable in a direction parallel to the emergent laser beam relative to the first emitting lens set 312. Thus, when the laser emitting apparatus 310 is assembled, the laser emitting component 313 can be located on a focal plane of the laser emitting apparatus 310 by adjusting the relative position between the first emitting lens set 312 and the second emitting lens set 311, and the first emitting lens set 312 collimates a fast axis of the emergent laser beam and the second emitting lens set 311 collimates a slow axis of the emergent laser beam, so as to adjust the relative position between the first emitting lens set 312 and the second emitting lens set 311, so that the spot size of the emergent laser beam can be adjusted to enable the emergent laser beam to smoothly pass through the through hole without being shielded and lost.

It should be noted that the changeable relative position between the first emitting lens set 312 and the second emitting lens set 311 in some embodiments only indicates that the laser transceiving assembly 300 can be adjusted before the optical adjustment. However, after the whole optical adjustment of the laser transceiving assembly 300, the relative position between the first emitting lens set 312 and the second emitting lens set 311 may be fixed, so that the relative position between the first emitting lens set 312 and the second emitting lens set 311 in the optically-adjusted laser transceiving assembly 300 may be unadjustable.

As shown in FIG. 15, the laser receiving apparatus 320 includes a receiving lens set 321, a fixing member 322, and a laser receiving component 323. The fixing member 322 defines a through hole. One side of the fixing member 322 is provided with the receiving lens set 321, and the other side is provided with the laser receiving component 323, such that the laser receiving component 323 can receive the reflected laser beam sequentially passing through the receiving lens set 321 and the through hole.

In the laser transceiving assembly 300, the laser emitting apparatus 310 and the laser receiving apparatus 320 are both fixedly connected to the transceiving shell 330, such that the optical paths of the emergent laser beam and the reflected laser beam have relevance. During the manufacture of the laser transceiving assembly 300, an individual optical adjustment may be performed on each laser transceiving assembly 300, such that the emergent laser beam emitted by the laser emitting apparatus 310 matches the reflected laser beam received by the laser receiving apparatus 320 in each laser transceiving assembly 300. Thus, when the LiDAR 10 has a plurality of laser emitting apparatuses 310 and a plurality of laser receiving apparatuses 320, the assembly cycle of the LiDAR 10 is reduced by configuring a plurality of laser transceiving assemblies 300 after completion of optical matching. After the laser emitting apparatus 310 is mounted on the transceiving shell 330, the focal length can be independently adjusted by changing the distance between the first emitting lens set 312 and the second emitting lens set 311, so that the adaptability of the laser emitting apparatus 310 can be enhanced.

There are various structures for adjusting the distance between the first emitting lens set 312 and the second emitting lens set 311. For example, as shown in FIGS. 15 and 17, in an embodiment, the first emitting lens set 312 includes a first emitting lens cone, and the second emitting lens set 311 includes a second emitting lens cone. One end of the first emitting lens cone facing away from the laser emitting component 313 sleeves one end of the second emitting lens cone close to the laser emitting component 313, and the second emitting lens cone can move horizontally in the first emitting lens cone along the direction parallel to the optical axis. That is, the size change of the portion of the second emitting lens cone extending into the first emitting lens cone will change the distance between the center of the first emitting lens set 312 and the center of the second emitting lens set 311, so as to adjust the overall focal lengths of the first emitting lens set 312 and the second emitting lens set 311. In some embodiments, one end of the first emitting lens cone facing away from the laser emitting component 313 may be in threaded connection with one end of the second emitting lens cone close to the laser emitting component 313, and at this time, the distance between the center of the first emitting lens cone and the center of the second emitting lens cone may be adjusted by controlling the second emitting lens cone to rotate relative to the first emitting lens cone. In some embodiments, one end of the first emitting lens cone facing away from the laser emitting component 313 may be bonded to one end of the second emitting lens cone close to the laser emitting component 313. It should be noted that when the first emitting lens cone and the second emitting lens cone are bonded, the bonding needs to be performed after the completion of the optical adjustment of the laser emitting apparatus 310. That is, after the laser emitting component 313 is located on the whole focal plane of the first emitting lens set 312 and the second emitting lens set 311 by adjusting the distance between the center of the first emitting lens cone and the center of the second emitting lens cone, the first emitting lens cone and the second emitting lens cone are bonded and fixed; and after the first emitting lens cone and the second emitting lens cone are bonded and fixed, the distance between the first emitting lens cone and the second emitting lens cone cannot be adjusted.

In order to match the optical paths between the laser emitting apparatus 310 and the laser receiving apparatus 320, the distance between the laser emitting apparatus 310 and the transceiving shell 330 can be adjusted. In some embodiments, an end portion of the second emitting lens cone facing away from the first emitting lens cone can be made to protrude into the laser emitting passage 333 of the transceiving shell 330, and can be moved in the laser emitting passage 333 in a direction parallel to the emergent laser beam. In some embodiments, the second emitting lens cone can also be in threaded connection with or be bonded to the inner peripheral wall of the transceiving shell 330.

In the above embodiments, the first emitting lens set 312 and the second emitting lens set 311 are directly connected, so that the distance adjustment therebetween (i.e., the distance adjustment between the centers of the two) can be realized. In an embodiment, the distance adjustment between the two can also be realized by not directly connecting the two. For example, the second emitting lens cone can be completely inserted into the laser emitting passage 333 of the transceiving shell 330, and the end portion of the first emitting lens cone close to the second emitting lens cone can be inserted into the laser emitting passage 333 and is movable in the laser emitting passage 333 in a direction parallel to the emergent laser. Thus, when the first emitting lens cone moves relative to the transceiving shell 330, the distance between the first emitting lens cone and the second emitting lens cone also changes accordingly. Similarly, when the end portion of the first emitting lens cone close to the second emitting lens cone is movable in the laser emitting passage 333, the first emitting lens cone can be in threaded connection with or be bonded to the inner peripheral wall of the laser emitting passage 333. In some embodiments, the first emitting lens cone can extend into the laser emitting passage 333 only near the end portion of the second emitting lens cone, and the first emitting lens cone can also extend entirely into the laser emitting passage 333.

Figure 14:
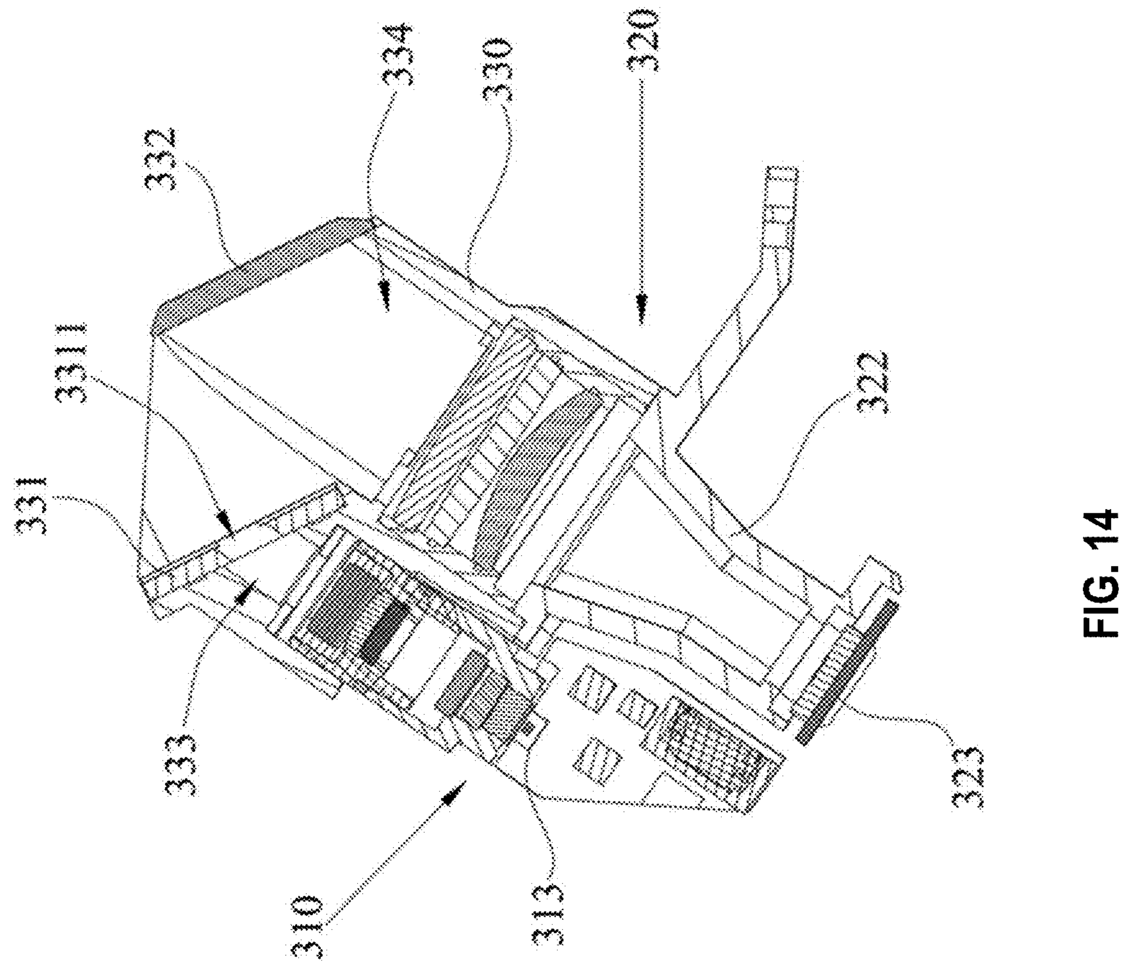
FIG. 14 is a schematic full-sectional diagram of a laser transceiving assembly according to an embodiment of the present application.

In order to adjust the optical path of the laser receiving apparatus 320, the distance between the receiving lens set 321 and the fixing member 322 can be adjusted (before the completion of the optical adjustment). In an embodiment, the receiving lens cone of the receiving lens set 321 can extend into the through hole of the fixing member 322, and the end portion of the receiving lens set 321 close to the fixing member 322 can be in a threaded connection with or be bonded to the fixing member 322 (bonded after the completion of the optical adjustment). In some embodiments, as shown in FIGS. 14 to 16, the receiving lens set 321 is completely arranged in the laser receiving passage 334, one end of the fixing member 322 facing away from the laser receiving component 323 is in a threaded connection with the transceiving shell 330, and the laser receiving component 323 is connected with an end portion of the fixing member 322 facing away from the receiving lens set 321. The receiving lens set 321 can move in the laser receiving passage 334 along a direction parallel to the passage axis of the laser receiving passage 334, and the relative position between the laser receiving lens set 321 and the laser receiving component 323 can be adjusted by the movement of the laser receiving lens set 321, so that the laser receiving component 323 can be located on the focal plane of the receiving lens set 321 to receive the reflected laser beam converged by the receiving lens set 321. In some embodiments, the receiving lens set 321 can be in a threaded connection with or be bonded to the inner peripheral wall of the laser receiving passage 334 (bonded after the completion of the optical adjustment).

In order to fix the laser transceiving assembly, the laser transceiving assembly needs to be provided with a connecting part 3222, and the connecting part 3222 is configured to fix the laser transceiving assembly 300 into the LiDAR 10. In an embodiment, the connecting part 3222 of the laser transceiving assembly 300 can be connected to the transceiving shell 330, such that the laser receiving apparatus 320 and the laser emitting apparatus 310 are simpler to manufacture. In some embodiments, as shown in FIGS. 15 and 17, the connecting part 3222 of the laser transceiving assembly 300 is a portion of the fixing member 322. That is, the fixing member 322 includes a passage shell 3221 and the connecting part 3222, and the passage shell 3221 defines the through hole. One side of the through hole is provided with the laser receiving component 323, and the other side of the through hole is provided with the receiving lens set 321. The connecting part 3222 is connected with the passage shell 3221, and the connecting part 3222 is configured to fix the laser transceiving assembly 300 with an external component (a component of the LiDAR 10 other than the laser transceiving assembly 300, for example, a base of the LiDAR 10). In some embodiments, the connecting part 3222 may be provided with a threaded hole, a bolt hole, a pin hole, or other fixing structures, such that the laser transceiving assembly 300 can be fixed in the LiDAR 10 by using a fastener such as a screw, a bolt, or a pin.

Since the angle of the laser beam emitted or received by the laser transceiving assembly 300 needs to be correspondingly set according to the actual design requirements, and the laser receiving component 323 is connected to the fixing member 322, the structural design that the connecting part 3222 serves as a portion of the fixing member 322 enables the angle of the laser beam emitted or received by the laser transceiving assembly 300 relative to the external component of the laser transceiving assembly 300 to be adjusted by adjusting the connection relationship between the connecting part 3222 and the passage shell 3221. In other words, when the connecting part 3222 serves as a portion of the fixing member 322, the angle of the laser beam emitted or received by the laser transceiving assembly 300 in the LiDAR 10 can be indirectly adjusted by adjusting the included angle between a hole axis of the threaded hole, the bolt hole or the pin hole of the connecting part 3222, and a hole axis of the through hole of the passage shell 3221.

For example, when the laser transceiving assembly 300 is arranged on the first rotary part 100, an included angle between the laser beam emitted or received by the laser transceiving assembly 300 and the rotary axis 20 needs to be specially designed according to actual requirements. When the connecting part 3222 serves as a portion of the fixing member 322, the included angle between the laser beam emitted or received by the laser transceiving assembly 300 and the rotary axis 20 can be indirectly adjusted by only adjusting an included angle between a hole axis of the threaded hole, the bolt hole or the pin hole on the connecting part 3222, and a hole axis of the through hole of the fixing member 322. That is, a design of the position arrangement of the laser transceiving assembly 300 relative to the LiDAR 10 is transferred into a simple component structure design of the fixing member 322, thereby reducing the design difficulty.

Each lens set of the laser emitting apparatus 310 is configured to collimate the emergent laser beam, but it is difficult to make the emergent laser beam an ideal 0° laser beam, so the emergent laser beam has a small diffusion angle, which makes the spot formed by the reflected laser beam greater than the spot formed by the emergent laser beam. Therefore, if the emergent laser beam passing through the beam passing hole 3311 is reflected back by an unexpected object (for example, the emergent laser beam does not irradiate the object to be detected and is reflected back by other components midway), a part of the emergent laser beam will irradiate the reflector surface around the beam passing hole 3311, and be received by the laser receiving apparatus 320 after being reflected. The laser beam reflected back by the unexpected object is a useless interference laser beam, and the interference laser beam is easily received by the laser receiving apparatus 320 to form an interference signal after being reflected to the second reflector 332 by the first reflector 331.

Figure 19:
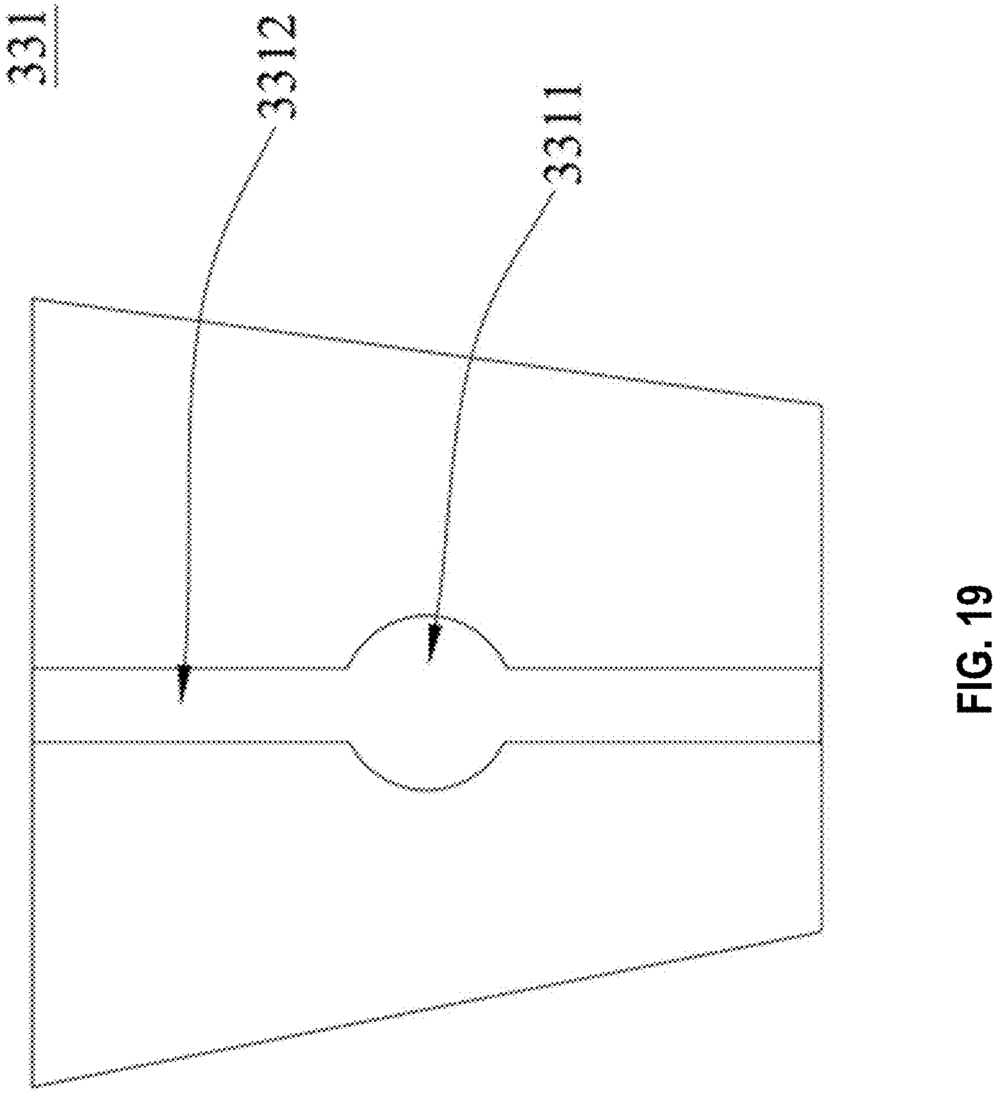
FIG. 19 is a schematic front diagram of a first reflector according to an embodiment of the present application.

In order to solve the above problem, in some embodiments, the laser emitting component 313 includes a plurality of emitting units, and each emitting unit can emit the emergent laser beam. The emitting units are arranged along a straight line perpendicular to the passage axis of the laser emitting passage 333. As shown in FIGS. 17 and 19, the first reflector 331 has a straight non-reflection region, the length direction of the non-reflection region is parallel to the straight line along which the emitting units are arranged, and the center of the non-reflection region coincides with the center of the light hole. When the non-reflection region is formed on the first reflector 331, the laser reflected back by the unexpected object is probably reflected to a non-reflection region. As the non-reflection region does not reflect the laser beam, the laser beam reflected back by the unexpected object is not reflected to the second reflector 332, thus avoiding the formation of an interference signal and thereby improving the detection precision of the laser transceiving assembly 300.

In some embodiments, a light-absorbing coating or a light-absorbing film may be arranged on the surface of the first reflector 331 to form a non-reflection region (i.e., the reflector surface is coated with a reflective film, and then the non-reflection region is coated with a light-absorbing coating or the light-absorbing film). The surface of the first reflector 331 other than the non-reflection region may also be coated with a reflective film (i.e., a reflective film is not arranged on the non-reflection region). The reflective film of the non-reflection region on the first reflector 331 may also be removed, for example, a groove may be formed in a position of the non-reflection region on the first reflector 331, such that the non-reflection region cannot reflect the laser.

The reflecting assembly 400 is configured to reflect the emergent laser beam and the reflected laser beam, so as to change a direction of the emergent laser beam to irradiate the object to be detected, and to change a direction of the reflected laser beam to irradiate the corresponding laser transceiving assembly 300. In some embodiments, the reflecting assembly 400 is connected with the second rotary part 200 and can rotate with the rotation of the second rotary part 200. When the second rotary part 200 rotates, the angle of the emergent laser beam relative to the reflecting assembly on the plane perpendicular to the rotary axis 20 changes, and the reflection angle of the emergent laser beam by the reflecting assembly changes accordingly, such that the LiDAR 10 can form a certain field of view.

It can be understood that, when the first rotary part 100 includes the outer shell 112 and the second rotary part 200 is arranged inside the first rotary part 100, the outer shell 112 may include a light-transmissive part 113. The light-transmissive part 113 is configured to be light-transmissive to allow passage of the emergent laser beam and the reflected laser beam. The outer shell 112 may be made of a light-transmissive material as a whole, or may be made of a light-transmissive material only for the portion that is required for the emergent laser beam and the reflected laser beam to pass through, such as a high-transmittance optical filter. When the outer shell 112 has the light-transmissive part 113, the outer shell 112 may be integrally formed by two materials (one light-transmissive material and one opaque material); or can be integrally formed by a light-transmissive material, and then a light shielding layer (the light shielding layer may be light shielding ink, light shielding paster, or the like) is attached to a portion that is not required to be light-transmissive. The outer shell 112 can also be divided into two portions, including a light-transmissive portion and an opaque portion, which are separately formed and then assembled to form the outer shell 112.

In some embodiments, the reflecting assembly 400 includes at least two reflectors 410. For example, the reflecting assembly 400 may include two reflectors 410, three reflectors 410, four reflectors 410, or more. In some embodiments, each reflector 410 of the reflecting assembly 400 is arranged around the rotary axis 20, and at least two reflectors 410 have different included angles with the plane perpendicular to the rotary axis 20. That is, regardless of the number of the reflectors 410, two reflectors 410 can reflect the emergent laser beam emitted from the laser transceiving assembly 300 in different directions, and projections of the two directions in the plane perpendicular to the rotary axis 20 intersect. For example, when the number of the reflectors 410 is eight, two reflectors 410 may have different included angles with the plane perpendicular to the rotary axis 20, or three reflectors 410 may have different angles with the plane perpendicular to the rotary axis 20, or eight reflectors 410 may have different angles with the plane perpendicular to the rotary axis 20.

In some embodiments, in a motion of the reflecting assembly 400 rotating along with the second rotary part 200 relative to the first rotary part 100, each reflector 410 is configured to reflect the emergent laser beam emitted by the laser transceiving assembly 300 to the object to be detected and simultaneously reflect the reflected laser beam reflected back by the object to be detected to the corresponding laser transceiving assembly 300. That is, the reflected laser beam reflected back by the object to be detected after the emergent laser beam reflected by each reflector 410 irradiates the object to be detected will be reflected back to the laser transceiving assembly 300 by the reflector. When the number of the laser transceiving assemblies 300 is only one and the first rotary part 100 rotates relative to the second rotary part 200 within a certain angle, the laser beam emitted and received by the laser transceiving assembly 300 is reflected by one of the reflectors 410, and the other reflectors 410 do not operate (i.e., do not reflect the laser beam). When the first rotary part 100 rotates relative to the second rotary part 200 within another angle, the previously-operated reflector 410 does not operate, and other emitting lens operates instead.

When the number of the laser transceiving assemblies 300 is plural (two or more) and is less than the number of the reflectors 410, two or more reflectors 410 may operate simultaneously. When the number of the laser transceiving assemblies 300 is greater than the number of the reflectors 410, it may also happen that one reflector 410 reflects two laser beams from different laser transceiving assemblies 300 simultaneously.

For the LiDAR 10 in the present disclosure, on the one hand, because the reflecting assembly 400 can rotate relative to the laser transceiving assemblies 300, each laser transceiving assembly 300 forms a field of view covering a certain angle in a direction perpendicular to the rotary axis 20, and on the other hand, the reflecting assembly 400 in the embodiment has at least two reflectors 410 having different included angles between the reflectors and a plane perpendicular to the rotary axis 20, therefore the detection fields of view of the laser transceiving assemblies 300 formed relative to the reflectors 410 having different included angles stagger in a direction parallel to the rotary axis 20, and then at least two detection fields of view formed by the LiDAR 10 stagger in a direction parallel to the rotary axis 20. Compared with a single detection field of view in the prior art, the field of view of the LiDAR provided herein is wider. The at least two detection fields of view formed by the LiDAR 10 can also partly overlap, and thus the overlapped fields of view have a higher detection precision.

In the aforementioned embodiments, only one laser transceiving assembly 300 may be arranged in the LiDAR 10, and then the laser beam generated and received by the laser transceiving assembly 300 is reflected by a plurality of reflectors 410 alternately, and each reflector 410 reflects the laser beam of the laser transceiving assembly 300 alternately by rotating around the rotary axis 20. For the purpose of switching the reflection state of each reflector 410, in an embodiment, the second rotary part 200 may rotate in a reciprocating manner within a preset angle to switch the operation state of each reflector 410. For example, when the reflecting assembly 400 includes two reflectors 410 having different included angles with the plane perpendicular to the rotary axis 20, and each reflector 410 corresponds to an angle of ten degrees (here, only an exemplary angle) of the second rotary part 200 (i.e., when the second rotary part 200 rotates relative to the first rotary part 100 within a specific angle range often degrees, one of the reflectors 410 can reflect the laser beam of the laser transceiving assembly 300, and when the second rotary part 200 rotates relative to the first rotary part 100 within another specific angle range of ten degrees, the other reflector 410 can reflect the laser beam of the laser transceiving assembly 300), the second rotary part 200 can rotate twenty degrees in a first direction around the rotary axis 20, so as to switch the operating states of the two reflectors 410, and then can rotate twenty degrees in a second direction (opposite to the first direction) around the rotary axis 20, thereby switching the operation state of the two reflectors 410 again. During the above operation process, the second rotary part 200 is in a reciprocating rotation state.

In addition to the second rotary part 200 being capable of rotating in a reciprocating manner relative to the first rotary part 100 within a specific angle, in another embodiment, the second rotary part 200 can also be capable of continuous rotation (i.e., always rotating in a single direction) relative to the first rotary part 100. In some embodiments, the second rotary part 200 is configured to have a rotation motion of rotating relative to the first rotary part, and the rotation stroke is 360 degrees. That is, when the second rotary part 200 rotates around the rotary axis 20 relative to the first rotary part 100, it continuously rotates in only one direction (i.e., the second rotary part 200 repeats the above-mentioned rotation motion), without rotating in a reciprocating manner within a certain angle. However, the operation state of each reflector 410 can be switched by continuously rotating in one direction, and the rotation process of the second rotary part 200 is not required to be precisely controlled.

When the second rotary part 200 continuously rotates along one direction relative to the first rotary part 100, if there is a gap between the reflectors 410, it is easy to cause a waste of the motion of the second rotary part 200 (that is, when the second rotary part 200 rotates to a certain position, no reflector 410 can reflect the laser beam of a corresponding laser transceiving assembly 300, so that the LiDAR 10 cannot work at this time). In order to fully utilize the rotation motion of the second rotary part 200, in an embodiment, every two adjacent reflectors 410 may be connected to each other in a circumferential direction around the rotary axis 20 such that there is no gap between the reflectors 410. Furthermore, in some embodiments, the number of the reflectors 410 may be three or more, and the reflectors 410 are connected to form an annular reflector set. For example, when the number of the reflectors 410 is three, the reflecting surfaces of the three reflectors 410 may be the outer side surfaces of triangular pyramids or the outer side surfaces of triangular truncated pyramids. When the number of the reflectors 410 is four, the reflecting surfaces of the four reflectors 410 may be the outer side surfaces of the rectangular pyramids or the outer side surfaces of the rectangular truncated pyramids. When the number of the reflectors 410 is plural, a structure is formed by combining these reflectors, and so on, which is not repeated herein. When the above-mentioned structure is formed by combining the reflectors, no matter where the second rotary part 200 rotates, there is a reflector 410 which can reflect the laser of the laser transceiving assembly 300, such that the working efficiency of the LiDAR 10 is improved.

Figure 6:
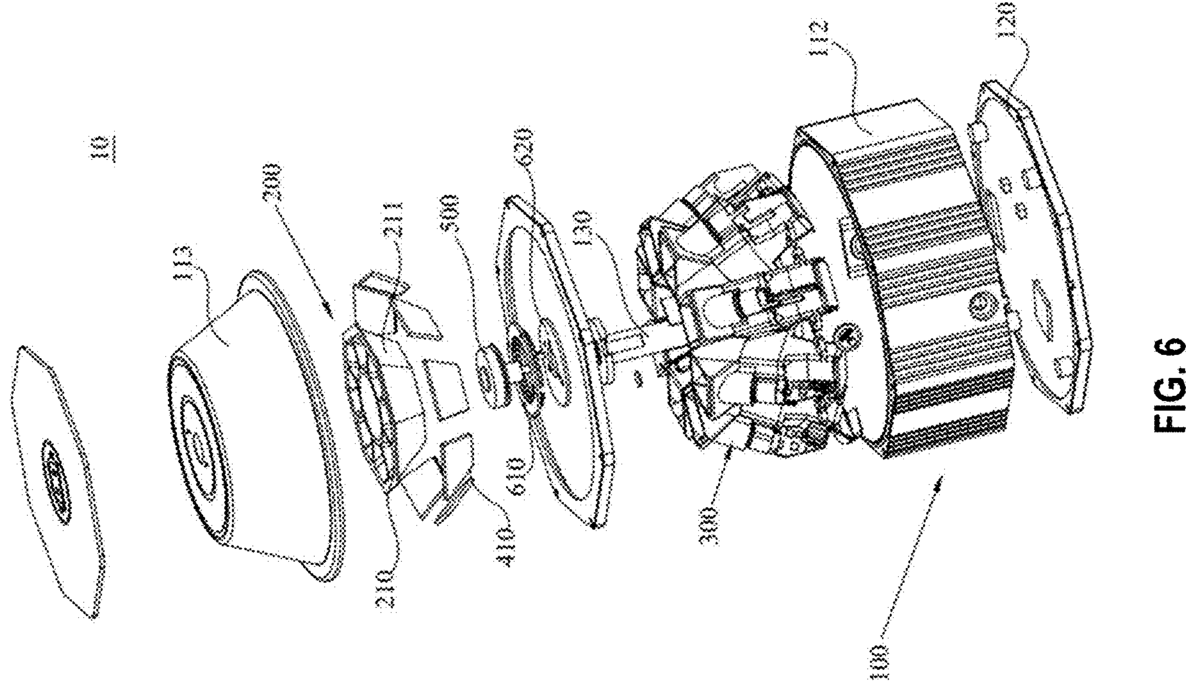
FIG. 6 is a second schematic exploded diagram of a LiDAR according to an embodiment of the present application.
Figure 7:
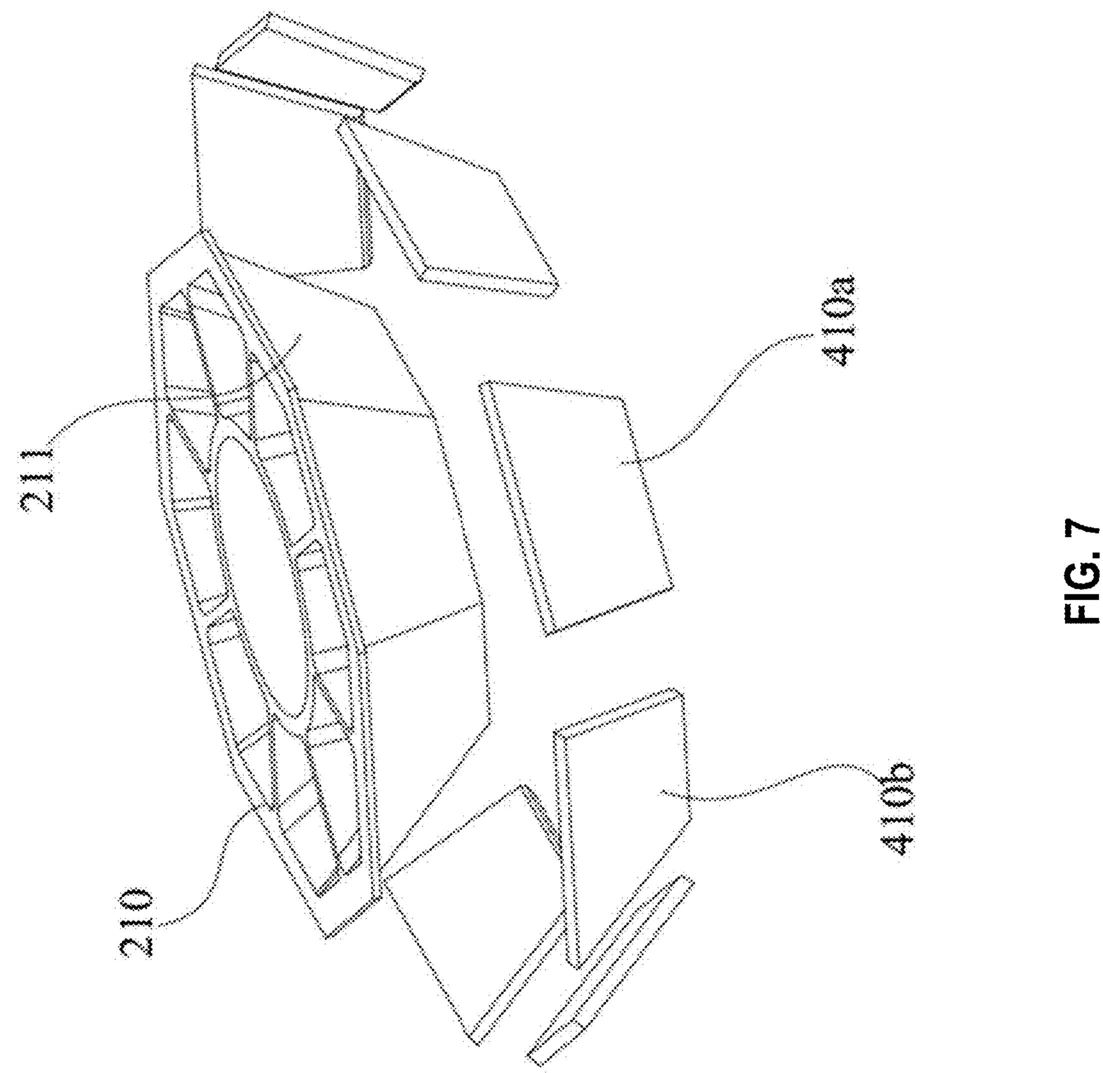
FIG. 7 is a schematic exploded diagram of a rotator and a reflector set according to an embodiment of the present application.

When the reflectors are combined to form an annular reflector set, the second rotary part 200 may include a rotary table 210 in order to arrange the reflectors 410, and the rotary table 210 is connected to the second rotary part 200 and can rotate around the rotary axis 20. In some embodiments, the rotary axis 20 may pass through the rotary table 210 or may be offset from the rotary table 210. The rotary table 210 includes a plurality of reflecting surfaces 211, each reflector 410 being arranged on the reflecting surfaces 211 in a one-to-one correspondence manner. In some embodiments, when the annular reflector set combined by the reflectors is the outer side surfaces of the triangular pyramid, the rotary table 210 is in the shape of a triangular pyramid. When the annular reflector set combined by the reflectors is the outer side surfaces of the triangular truncated pyramid, the rotary table 210 may be in the shape of the triangular truncated pyramid. In some embodiments, as shown in FIGS. 6 to 7, the reflecting assembly 400 includes eight reflectors 410, and the rotary table 210 is in the shape of an octagonal truncated pyramid, each reflector 410 being arranged on eight outer side surfaces of the rotary table 210 (i.e., eight reflecting surfaces 211 of the rotary table 210) in a one-to-one correspondence manner.

In some embodiments, the number of the reflecting surfaces 211 of the rotary table 210 may be greater than the number of the reflectors 410. For example, when the number of the reflectors 410 is one, the rotary table 210 may still be in the shape of an octagonal truncated pyramid, and one of the reflecting surfaces 211 on the rotary table 210 is provided with the reflector 410, and the other reflecting surfaces 211 are not provided with the reflectors 410.

In some embodiments, when the reflectors are combined to form an annular reflector set, the number of the reflector sets may be plural, and the plurality of reflector sets are arranged in a direction parallel to the rotary axis 20 of the LiDAR 10. For example, the number of annular reflector sets may be two, and each reflector set has eight reflectors 410. Sixteen reflectors 410 of two reflector sets have different included angles with the plane perpendicular to the rotary axis 20, and each reflector 410 of one reflector set has a greater included angle with the plane perpendicular to the rotary axis 20 than each reflector 410 of the other reflector set has with the plane perpendicular to the rotary axis 20. In other words, the minimum angle between the reflector 410 of one reflector set and the plane perpendicular to the rotary axis 20 is greater than the maximum angle between the reflector 410 of the other reflector set and the plane perpendicular to the rotary axis 20. In some embodiments, two reflector sets are configured to be translatable in a direction parallel to the rotary axis 20. The above structure allows the detection field of view of the LiDAR 10 to be larger. It can be understood that when two reflector sets are in a certain position, the laser emitted and received by the laser transceiving assembly 300 is reflected by one of the reflector sets, and at this time, the LiDAR 10 has a detection field of view. When the LiDAR 10 needs to be switched for applying to other scenes, two reflector sets can be adjusted to enable the two emitting lens sets to translate along the direction parallel to the rotary axis 20, such that the reflector set in the operation state is switched, the detection field of view corresponding to the switched reflector set is different from the detection field of view corresponding to the previous reflector sets, and therefore the LiDAR 10 has two different detection fields of view due to the above structure, and the LiDAR 10 can be adapted to two different working scenes.

In some embodiments, the number of the reflector sets may be plural even if they are not combined to form an annular structure, and the reflector sets are arranged along the direction parallel to the rotary axis 20.

It is noted that any component having a reflecting surface capable of reflecting a laser beam can be referred to as a reflector 410. For example, the reflector 410 may be a reflective film (for example, a silver film) on the reflecting surface 211 of the rotary table 210, or the reflector 410 may be a complete mirror structure and is connected with the reflecting surface 211 of the rotary table 210 by adhesion.

When the reflector 410 is connected with the reflecting surface 211 of the rotary table 210 by adhesion, an adhesive may be firstly applied on the reflecting surface 211 of the rotary table 210. Then, the reflector 410 is attached to the adhesive of the reflecting surface 211, and the amount of the adhesive may be increased appropriately, such that after the reflector 410 is attached to the adhesive, the included angle between the reflector 410 and the rotary axis 20 may be finely adjusted, thereby positioning the reflector 410 more accurately.

Figure 8:
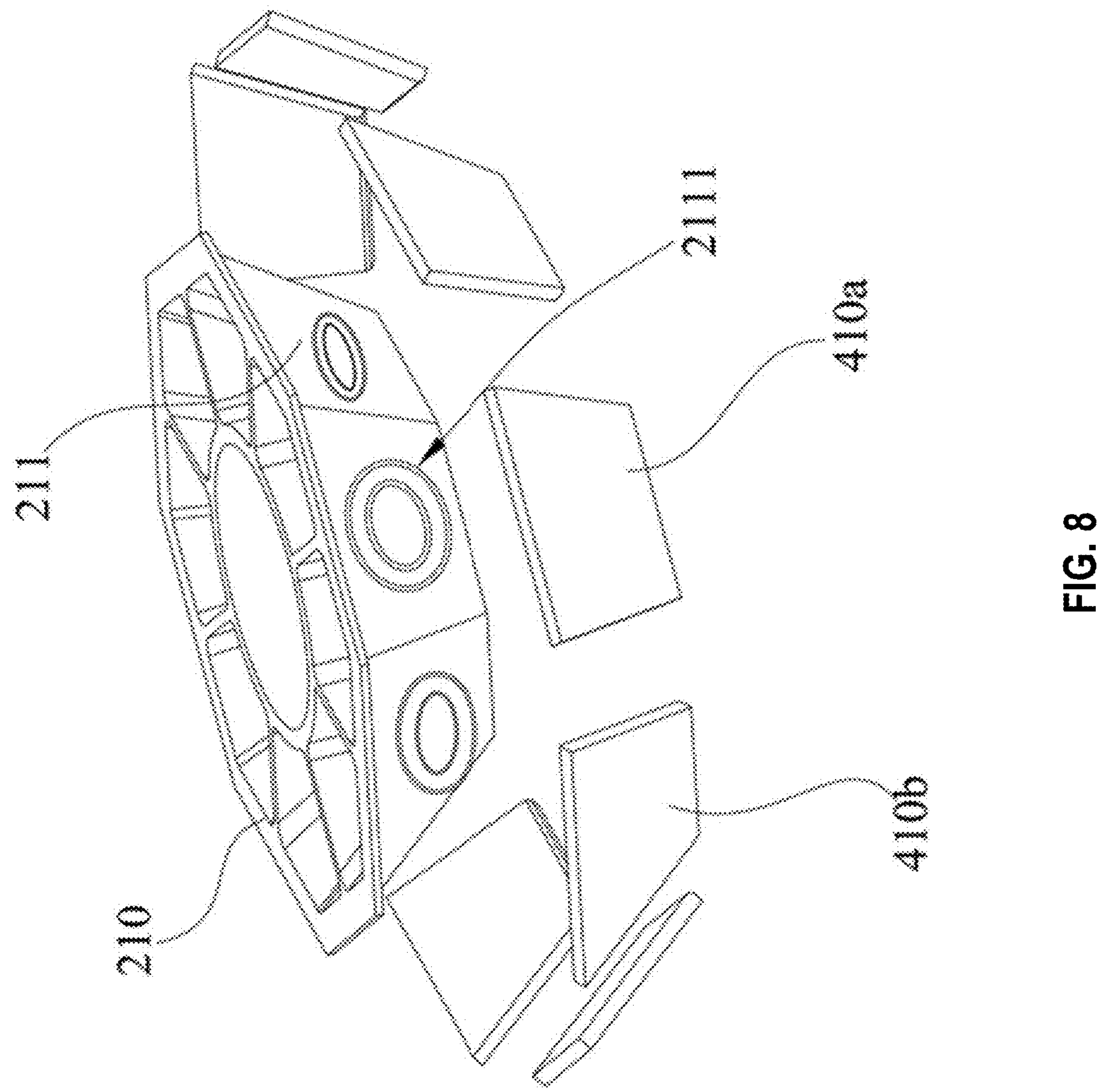
FIG. 8 is a schematic exploded diagram of a rotator and a reflector set according to another embodiment of the present application, where the structure of an adhesive applying groove is shown.
Figure 9:
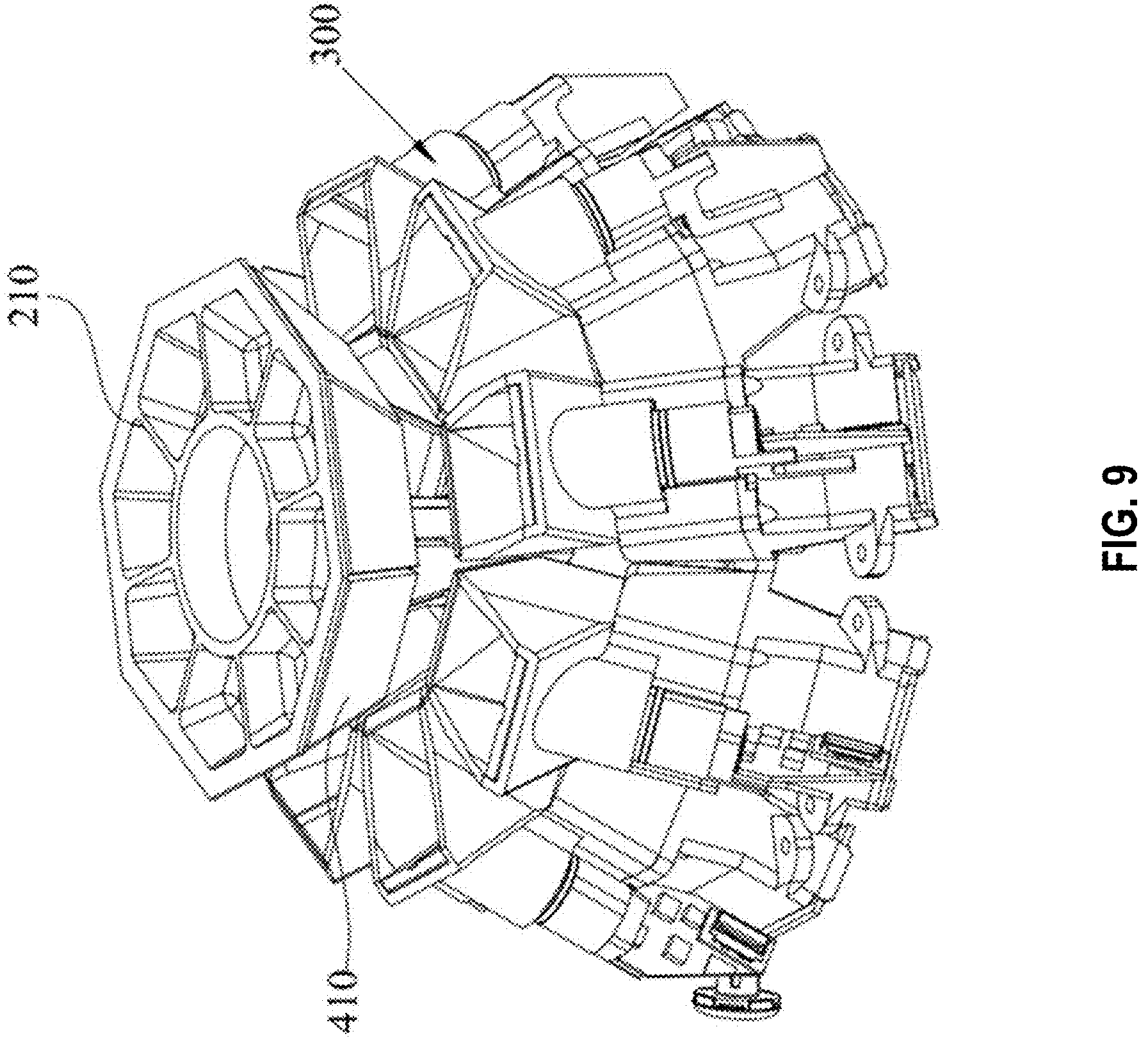
FIG. 9 is a schematic diagram of a combination of a rotator, a reflector set, and laser transceiving assemblies according to an embodiment of the present application.

In order to store a certain amount of adhesive, in some embodiments, each of the reflecting surfaces 211 of the rotary table 210 is provided with an adhesive applying groove 2111, and each adhesive applying groove 2111 is configured to fill the adhesive for adhering the reflector 410, thereby securing the firmness of the adhesion of the reflector 410 to the rotary table 210. Due to the existence of the adhesive applying groove 2111, the thickness of the adhesive on the reflecting surface 211 becomes uneven, the stress on the reflector 410 is uneven after the adhesive is solidified, and in addition, when the reflector 410 is extruded towards the reflecting surface 211 in the process of mounting the reflector 410 by using the adhesive with uneven thickness, the stress on the reflector 410 is uneven, such that the reflector 410 is easy to generate irregular deformation. In order to solve the above problem, in an embodiment, as shown in FIG. 8, each reflecting surface 211 is provided with a plurality of adhesive applying grooves 2111, each adhesive applying groove 2111 is annular, and the centers of the adhesive applying grooves 2111 on the same reflecting surface 211 coincide with each other, which can make the stress of the reflectors 410 relatively even when the reflectors 410 are extruded towards the direction facing the reflecting surface 211 and the adhesive is solidified, such that the deformation of the reflectors 410 can be reduced and the precision of detection field of view is promoted.

When the number of the reflectors 410 is three or more, the included angles between each reflector 410 and the plane perpendicular to the rotary axis 20 are different. Furthermore, in some embodiments, as shown in FIG. 7, the reflectors 410 include an initial reflector 410*a* and an end reflector 410*b* adjacent to the initial reflector 410*a*, and included angles between the reflectors 410 and the plane perpendicular to the rotary axis 20 gradually increase from the initial reflector 410*a* to the end reflector 410*b* along the circumferential direction around the rotary axis 20. This structure can facilitate processing and manufacturing of the reflector sets in one aspect, and can also enable the detection field of view of the laser transceiving assembly 300 to deviate from bottom to top or from top to bottom (when the rotary axis 20 is vertically arranged) in another aspect, such that the relevance between the scanned data is stronger, and the detected data can be conveniently analyzed.

In some embodiments, along the circumferential direction around the rotation axis 20 and from the initial mirror 410*a* to the end mirror 410*b*, the included angles between every two adjacent mirrors 410 may also be equal. For example, as shown in FIG. 7, the reflecting assembly 400 has eight reflectors 410. The reflector 410 with the smallest included angle with the plane perpendicular to the rotary axis 20 is referred to as the initial reflector 410*a*, and the reflector 410 with the largest included angle with the plane perpendicular to the rotary axis 20 is referred to as the end reflector 410*b*. Along the circumferential direction around the rotary axis 20, from the initial reflector 410*a* to the end reflector 410*b*, an included angle between the first reflector 410 (i.e., the initial reflector 410*a*) and the second reflector 410 may be one degree (other degrees may be used in other embodiments), an included angle between the second reflector 410 and the third reflector 410 may also be one degree, an included angle between the third reflector 410 and the fourth reflector 410 may still be one degree, and by analogy an included angle between the seventh reflector 410 and the eighth reflector 410 is still one degree. However, an included angle between the eighth reflector 410 (i.e., the end reflector 410*b*) and the first reflector 410 is seven degrees. In other words, when the included angle between the initial reflector 410*a* and the end reflector 410*b* is X degrees, the included angle between every two adjacent reflectors 410 from the initial reflector 410*a* to the end reflector 410*b* along the circumferential direction around the rotary axis 20 is X/7 degrees.

When the number of the reflectors 410 is plural (two or more), in order to enable the reflectors 410 to reflect the laser beam at an appropriate angle, in some embodiments, the minimum value of the included angle between each reflector 410 and the rotary axis 20 is greater than 0 degrees, and the maximum value is less than 90 degrees. For example, the included angle between the reflector 410 and the rotary axis 20 may be 5 degrees, 10 degrees, 20 degrees, 40 degrees, 80 degrees, 85 degrees, or the like.

Figure 20:
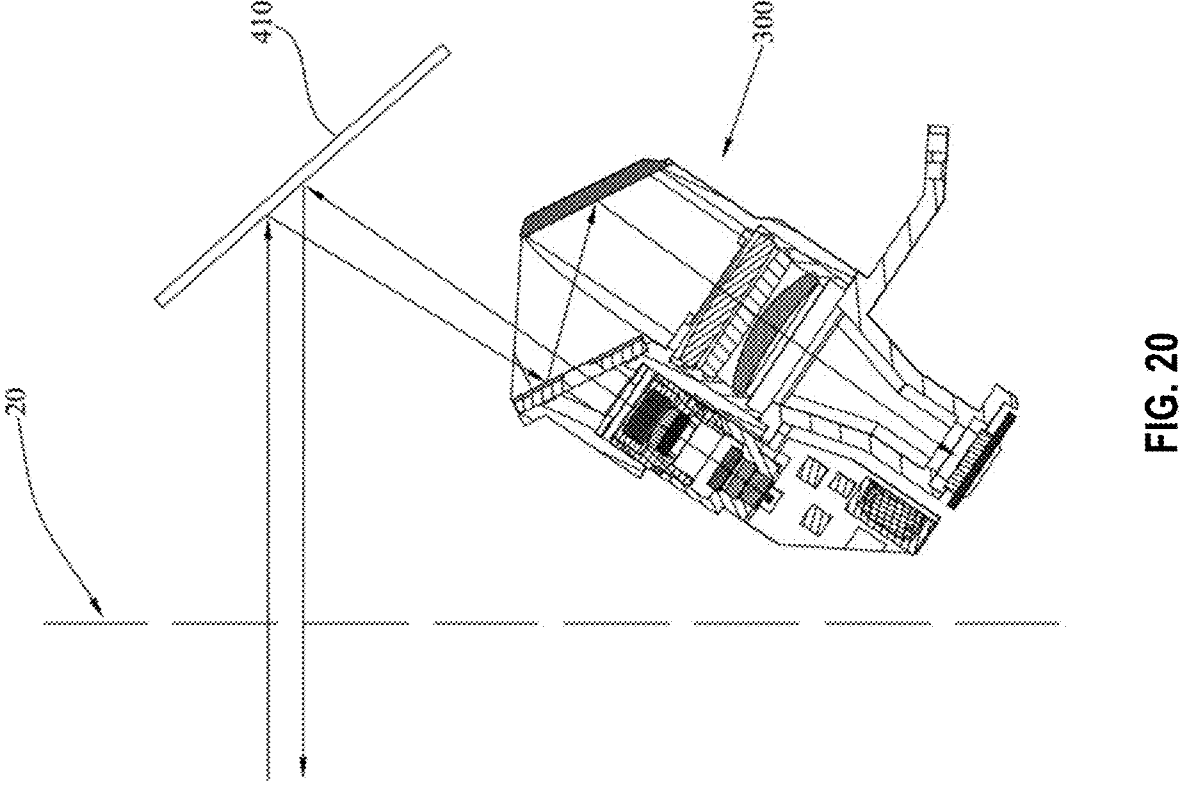
FIG. 20 is a schematic diagram of a combination of a laser transceiving assembly and a reflector according to another embodiment of the present application, where the surface of the reflector facing the rotary axis is a reflecting surface.

When the number of the reflectors 410 is plural, in order to smoothly reflect the laser beam to the object to be detected, in an embodiment, referring to FIG. 20, a surface of the reflector 410 facing the rotary axis 20 may be a reflecting surface (i.e., a surface for reflecting the laser beam). When the surface of the reflector 410 facing the rotary axis 20 is a reflecting surface, in order not to shield the emergent light by other reflectors 410 (reflectors 410 which do not reflect light in the present state), the reflectors 410 cannot be combined to form a closed annular shape, and a gap is formed at least in the optical path of the emergent laser beam, such that the emergent laser beam is emitted towards the object to be detected. Since the reflecting assembly 400 rotates around the rotary axis 20, the angle enclosed by the reflectors 410 is only 180 degrees at most, such that the emergent laser beam emitted from the laser transceiving assembly 300 is not shielded by other reflectors 410 which do not reflect light when the reflector sets rotate. When the enclosed angle of the reflectors 410 is 180 degrees, each laser transceiving assembly 300 (regardless of the number) of the LiDAR 10 has only half of the time to operate during the rotation of the reflector sets around the rotary axis 20. When the enclosed angle of the reflectors 410 is 90 degrees, each laser transceiving assembly 300 (regardless of the number) of the LiDAR 10 has only a quarter of the time to operate during the rotation of the reflector sets around the rotary axis 20.

When a surface of the reflector 410 facing away from the rotary axis 20 is a reflecting surface, the reflector 410 may be a flat mirror in order to facilitate the processing of the reflector 410. In an embodiment, in order to improve the resolution of the LiDAR 10, the reflector 410 may be a convex mirror, and the mirror surface may be a circular arc surface. A central axis of the circular arc surface intersects with the rotary axis 20, and a radius of the circular arc surface is greater than a maximum distance from the reflector 410 to the rotary axis 20. In another embodiment, in order to increase the detection field of view, the reflector 410 may be a concave mirror. The mirror surface may be a circular arc surface, and a central axis of the circular arc surface intersects with the rotary axis 20.

When the surface of the reflector 410 facing the rotary axis 20 is a reflecting surface, the reflector 410 may be a flat mirror in order to facilitate the processing of the reflector 410. In an embodiment, in order to improve the resolution of the LiDAR 10, the reflector 410 may be a concave mirror, and the mirror surface may be a circular arc surface. A central axis of the circular arc surface intersects with the rotary axis 20, and a radius of the circular arc surface is greater than a maximum distance from the reflector 410 to the rotary axis 20. In another embodiment, in order to increase the detection field of view, the reflector 410 may be a convex mirror. The mirror surface may be a circular arc surface, and a central axis of the circular arc surface intersects with the rotary axis 20.

In the above case where there is one laser transceiving assembly 300, when the number of the laser transceiving assemblies 300 is two or more, the enclosed angle of the reflectors 410 should be set smaller, and the actual angle needs to be adjusted according to the placement position of each laser transceiving assembly 300 and the number of the laser transceiving assemblies 300, so the detailed description is omitted here.

In contrast to the above-described embodiments, in some embodiments, as shown in FIGS. 2 to 6, the surface of each reflector 410 facing away from the rotary axis 20 is a reflecting surface. This structure enables the laser beam reflected by each reflector 410 not to affect each other. That is, the reflectors 410 can be combined to form an annular reflector set.

No matter the surface of the reflector 410 facing the rotary axis 20 is a reflecting surface or the surface of the reflector 410 facing away from the rotary axis 20 is a reflecting surface, the optical axis of the laser transceiving assembly 300 should form an angle θ with the reflector 410 (specifically, the reflecting surface), and the value range of the angle θ is $0° < \theta < 90°$. The optical axis of the laser transceiving assembly 300 may be a center line of the emergent laser emitted by the laser transceiving assembly 300, or a center line of the reflected laser received by the laser transceiving assembly 300. When the emergent laser and the reflected laser corresponding to the laser transceiving assembly 300 can be emitted or received by the same opening (i.e., the opening of the laser emitting passage 333), the center line of the emergent laser beam and the center line of the reflected laser beam of the laser transceiving assembly 300 coincide with each other, and the optical axis of the laser transceiving assembly 300 is the coincident center line. That is, the minimum included angle between the optical axis of the laser transceiving assembly 300 and the reflecting surface of the reflector 410 should be greater than 0 degrees, and the maximum included angle should be less than 90 degrees. For example, the included angle between the laser beam emitted or received by the laser transceiving assembly 300 and the reflecting surface of the reflector 410 may be 5 degrees, 10 degrees, 20 degrees, 40 degrees, 80 degrees, 85 degrees, or the like. The above is in the case that the number of the laser transceiving assembly 300 is one. Similarly, in the case that the number of the laser transceiving assemblies 300 is plural, the included angle θ between the optical axis of each laser transceiving assembly 300 and the reflecting surface of each reflector 410 should satisfy the above relationship $0° < \theta < 90°$. For example, the included angle between the laser beam emitted or received by each laser transceiving assembly 300 and the reflecting surface of the reflector 410 may be 5 degrees, 10 degrees, 20 degrees, 40 degrees, 80 degrees, 85 degrees, or the like.

When the reflectors are combined to form an annular reflector set, the number of the laser transceiving assemblies 300 may be one or more. And when the number of the laser transceiving assemblies 300 is plural, each laser transceiving assembly 300 may be arranged around the rotary axis 20. In some embodiments, the laser transceiving assemblies 300 may be further arranged in a circle around the rotary axis 20. And in a rotation motion of the second rotary part 200 rotating around the rotary axis 20, the emergent laser beam emitted by each laser transceiving assembly 300 may be reflected by at least one reflector 410, and at least one of the reflected laser beams reflected back by the reflectors 410 may be received by each laser transceiving assembly 300.

When the number of laser emitting assemblies is plural, the number of laser transceiving assemblies 300 may be less than the number of reflectors 410 (at this time, a certain reflector 410 may not reflect laser beams during the operation of LiDAR 10), or may be equal to the number of reflectors 410, or may be greater than the number of reflectors 410 (at this time, one reflector 410 may reflect laser beams generated by two laser transceiving assemblies 300 at the same time). In some embodiments, in order that the reflection capability of the reflectors 410 can be utilized to the maximum extent without causing mutual interference between the laser beams transmitted between the laser transceiving assemblies 300, the number of laser transceiving assemblies 300 is the same as the number of reflectors 410. For example, as shown in FIGS. 6 to 7, the LiDAR 10 has eight reflectors 410 which are combined to form an annular reflector set, and the number of the laser transceiving assemblies 300 is the same as the number of the reflectors 410, which is eight. In the rotation motion of the second rotary part 200 rotating around the rotary axis 20, each reflector 410 can correspondingly reflect the laser beam generated by one laser transceiving assembly 300 (under the boundary condition when the reflectors 410 are switched, one reflector 410 may reflect the laser beam generated by two laser transceiving assemblies 300, and the other reflector 410 does not reflect the laser beam, which is excluded).

In some embodiments, the number of the laser transceiving assemblies 300 and the number of the reflectors are equal, which are both plural. The laser transceiving assemblies 300 and the reflectors are both arranged around the rotary axis 20, and the reflectors 410 are combined to form an annular reflector set. The included angles between each reflector 410 and the plane perpendicular to the rotary axis 20 are different. In one aspect, this structure enables each laser transceiving assembly 300 to be in an operating state at all times and each reflector 410 to be in an operating state at all times during the operation of the LiDAR 10 (when the number of the reflectors 410 is larger, at least one reflector 410 does not operate at all times, and when the number of the laser transceiving assemblies 300 is larger, if the reflectors 410 are not combined to form an annular structure, it is possible that some laser transceiving assemblies 300 do not operate at some times), thus the operation efficiency of the LiDAR 10 is higher. In another aspect, this structure enables the LiDAR 10 to have a 360-degree field of view in a direction perpendicular to the rotary axis 20, thus the detection range of the LiDAR 10 is wider. And in yet another aspect, the fields of view formed by each laser transceiving assembly 300 through different reflectors 410 are not coincident, thus the detection range in a direction parallel to the rotary axis 20 is wider.

When the number of the laser transceiving assemblies 300 is plural, in an embodiment, the included angles between the laser beam emitted or received by each laser transceiving assembly 300 and the rotary axis 20 can be different, thus a wider field of view can be obtained. In another embodiment, the reflecting surface formed by the reflectors 410 may be a conical surface, and the first rotary part 100 rotates while the second rotary part 200 is stationary. In this way, the included angles between the laser beams emitted and received by the laser transceiving assemblies 300 and the rotary axis 20 are different. Each laser transceiving assembly 300 can form an independent detection field of view in the process of each laser transceiving assembly 300 rotating with the first rotary part 100.

The first rotary part 100 and the second rotary part 200 of the rotary device can rotate simultaneously, or only one of them can rotate. Since the first rotary part 100 is connected to the laser transceiving assembly 300, the first rotary part 100 needs to be connected to an electric device such as a circuit board 140, and when the first rotary part 100 rotates, how to guide the electric power to the first rotary part 100 is a difficult problem to be solved. Meanwhile, when the first rotary part 100 rotates, the data signal detected by the laser transceiving assembly 300 on the first rotary part 100 needs to be transmitted to the stationary second rotary part 200, which results in a higher signal transmission cost.

In an embodiment, in order to facilitate the manufacture of the LiDAR 10, the first rotary part 100 may be provided with a fixing structure configured to fix the LiDAR 10. The fixing structure may be any mechanical structure capable of fixing the LiDAR 10. For example, the fixing structure may be a fixing member 322 having a bolt hole, a pin hole, or a threaded hole. That is, when the LiDAR 10 is mounted, the fixing structure of the first rotary part 100 and a component to which the LiDAR 10 needs to be mounted may be mounted such that the first rotary part 100 is stationary relative to the component. In the operating state of the LiDAR 10, the first rotary part 100 is stationary, and the second rotary part 200 rotates relative to the first rotary part 100, such that in one aspect, the rotary portion of the LiDAR 10 does not need to be provided with an electric device, and therefore, the structure is simpler, and the manufacturing cost is lower; in another aspect, the laser transceiving assembly 300 is stationary, and therefore, the detected signal is more convenient to transmit.

In other embodiments, the second rotary part 200 may also be provided with a fixing structure. After the LiDAR 10 is mounted, the second rotary part 200 is stationary and the first rotary part 100 rotates relative to the second rotary part 200. Therefore, the reflector 410 can be conveniently positioned, the detection position of the laser reflected by the reflector 410 can be conveniently adjusted, and the detection precision is improved. However, when the second rotary part 200 is stationary and the first rotary part 100 rotates, data detected on the first rotary part 100 need to be transmitted to the second rotary part 200, and the electric power on the second rotary part 200 needs to be transmitted to the first rotary part 100. The specific implementation is disclosed in the prior art and will not be repeated herein.

In some embodiments, the first rotary part 100 and the second rotary part 200 may be provided with a fixing structure, which portion is stationary and which portion rotates are selected based on the actual requirements of users.

Figure 2:
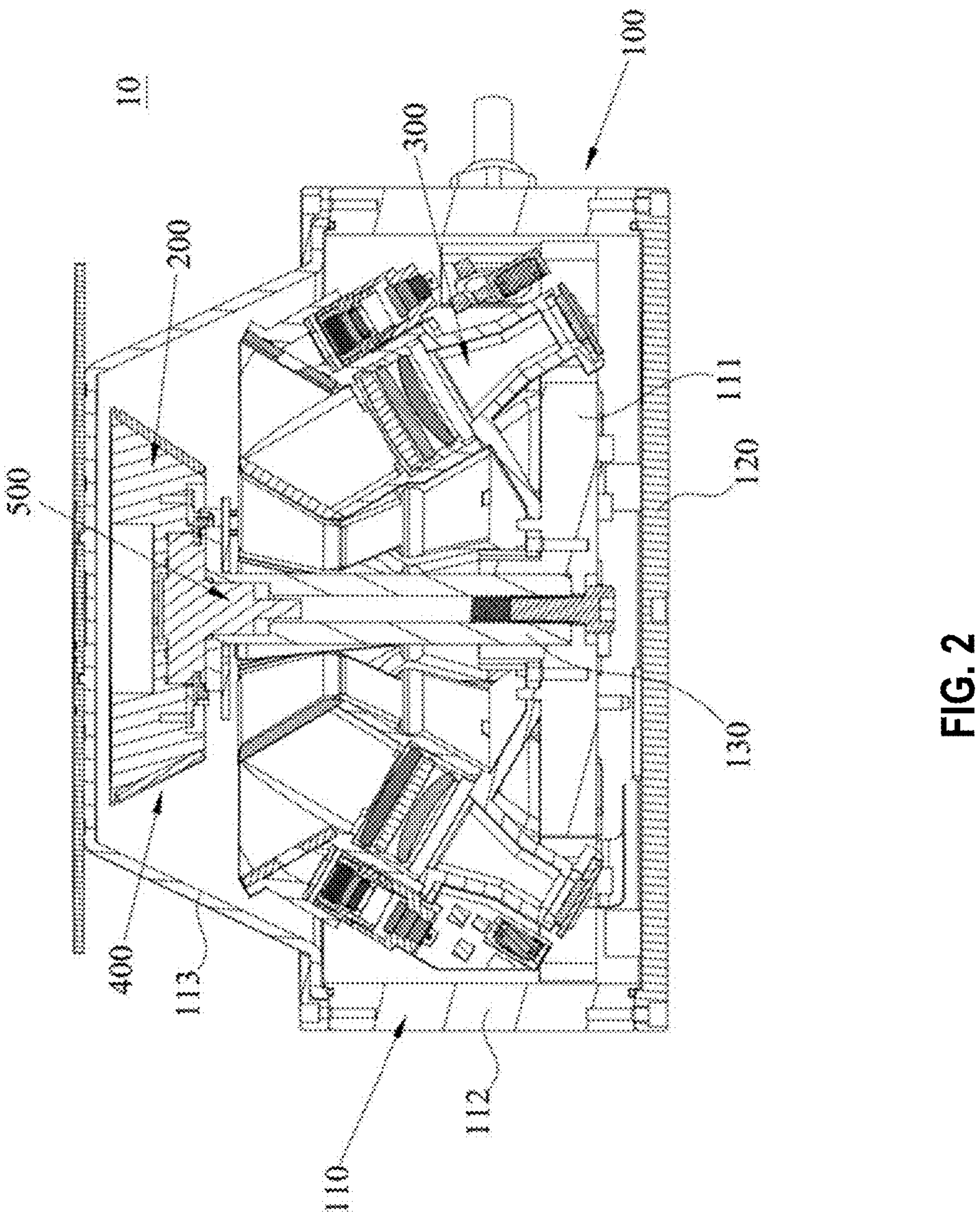
FIG. 2 is a schematic full-sectional diagram of a LiDAR according to an embodiment of the present application.
Figure 3:
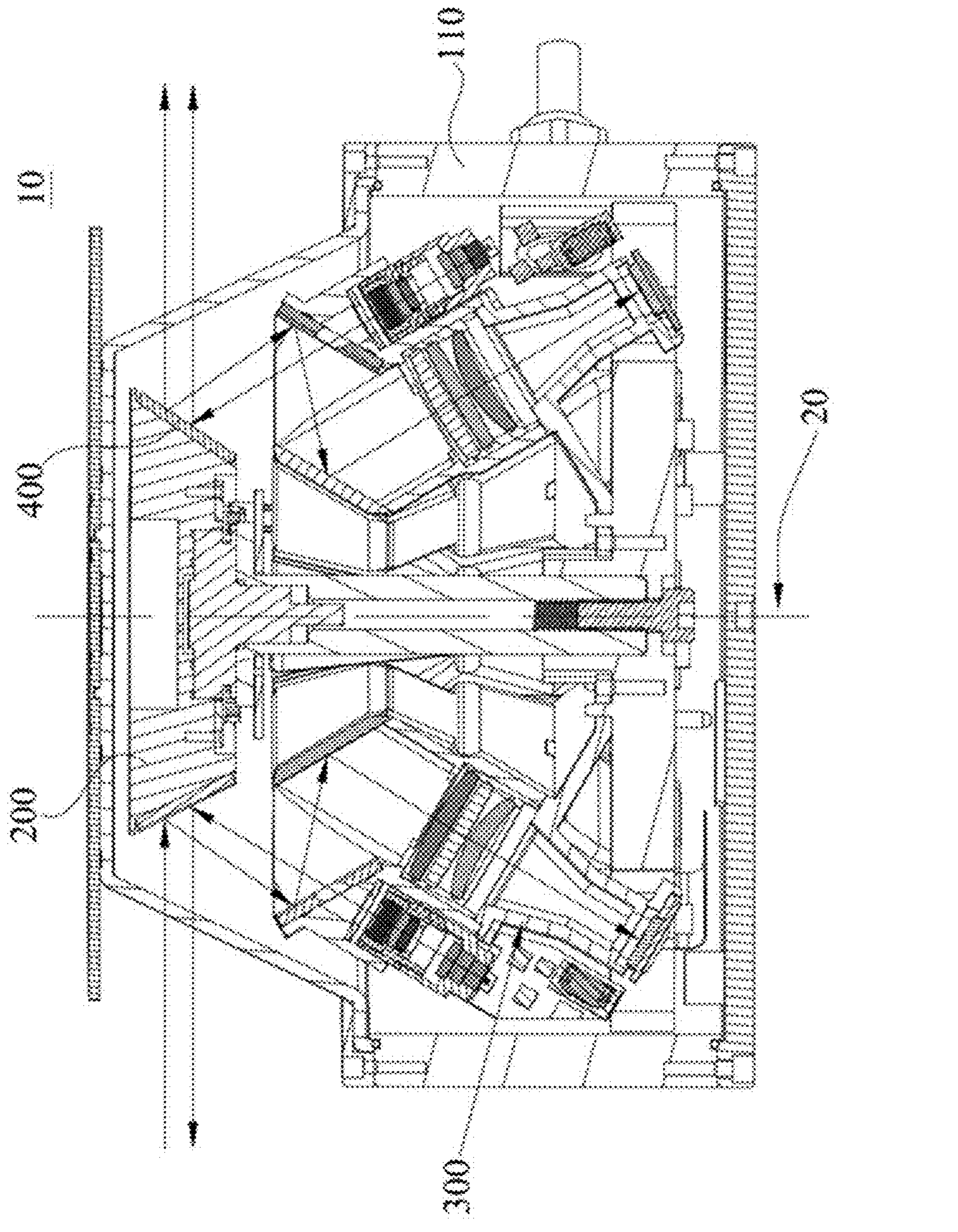
FIG. 3 is a schematic full-sectional diagram of a LiDAR according to an embodiment of the present application, which shows exemplary paths of emergent laser beams and reflected laser beams.
Figure 10:
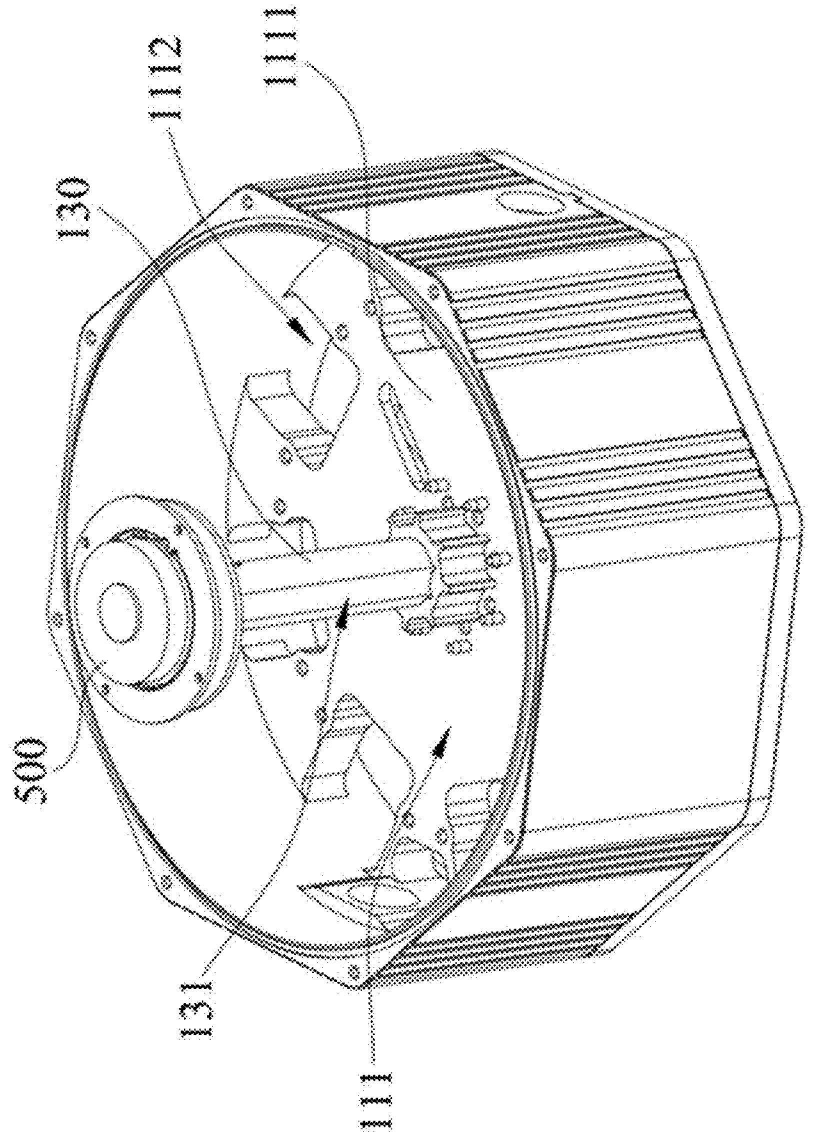
FIG. 10 is a schematic perspective diagram of a part of components of a first rotary part and a driving apparatus according to an embodiment of the present application.

The first rotary part 100 and the second rotary part 200 may rotate relative to each other by any known structure. In some embodiments, the first rotary part 100 may include a base and a supporting shaft 130, and the second rotary part 200 may be rotatably connected with the supporting shaft 130 of the first rotary part 100 and may rotate around the central axis of the supporting shaft 130 (i.e., the aforementioned rotary axis 20 may be parallel to or coincident with the central axis of the supporting shaft 130). The second rotary part 200 may be connected with a middle portion of the supporting shaft 130, or may be connected with an end portion of the supporting shaft 130 facing away from the base. As shown in FIGS. 2, 3 and 10, in some embodiments, the second rotary part 200 is connected with an end portion of the supporting shaft 130 facing away from the first rotary part 100. In some embodiments, the rotary table 210 may also be connected to the end portion of the supporting shaft 130 facing away from the first rotary part 100. And after the rotary table 210 is arranged on the supporting shaft 130, each of the reflecting surfaces 211 on the rotary table 210 is arranged around the central axis of the supporting shaft 130.

The first rotary part 100 and the second rotary part 200 can manually rotate relative to each other, and at this time, the second rotary part 200 may be directly connected with the supporting shaft 130 through a shaft hole fit, or may be connected to each other by a bearing. For the convenience of detection, in some embodiments, the rotation between the first rotary part 100 and the second rotary part 200 may be driven by using a driving apparatus 500. When the first rotary part 100 and the second rotary part 200 are driven to rotate relative to each other by using the driving apparatus 500, the second rotary part 200 may be connected with the supporting shaft 130 by a shaft hole or a bearing, and the driving apparatus 500 may be arranged between the second rotary part 200 and the supporting shaft 130 as well. In some embodiments, the second rotary part 200 may be connected to a stator of the driving apparatus 500, and the supporting shaft 130 may be connected to a rotor of the driving apparatus 500; or the second rotary part 200 is connected to the rotor of the driving apparatus 500, and the supporting shaft 130 is connected to the stator of the driving apparatus 500. The connection between the second rotary part 200 and the supporting shaft 130 by using the driving apparatus 500 can omit a rotation connection member (e.g., an additional bearing) between the second rotary part 200 and the supporting shaft 130, thereby reducing the manufacturing cost.

Figure 18:
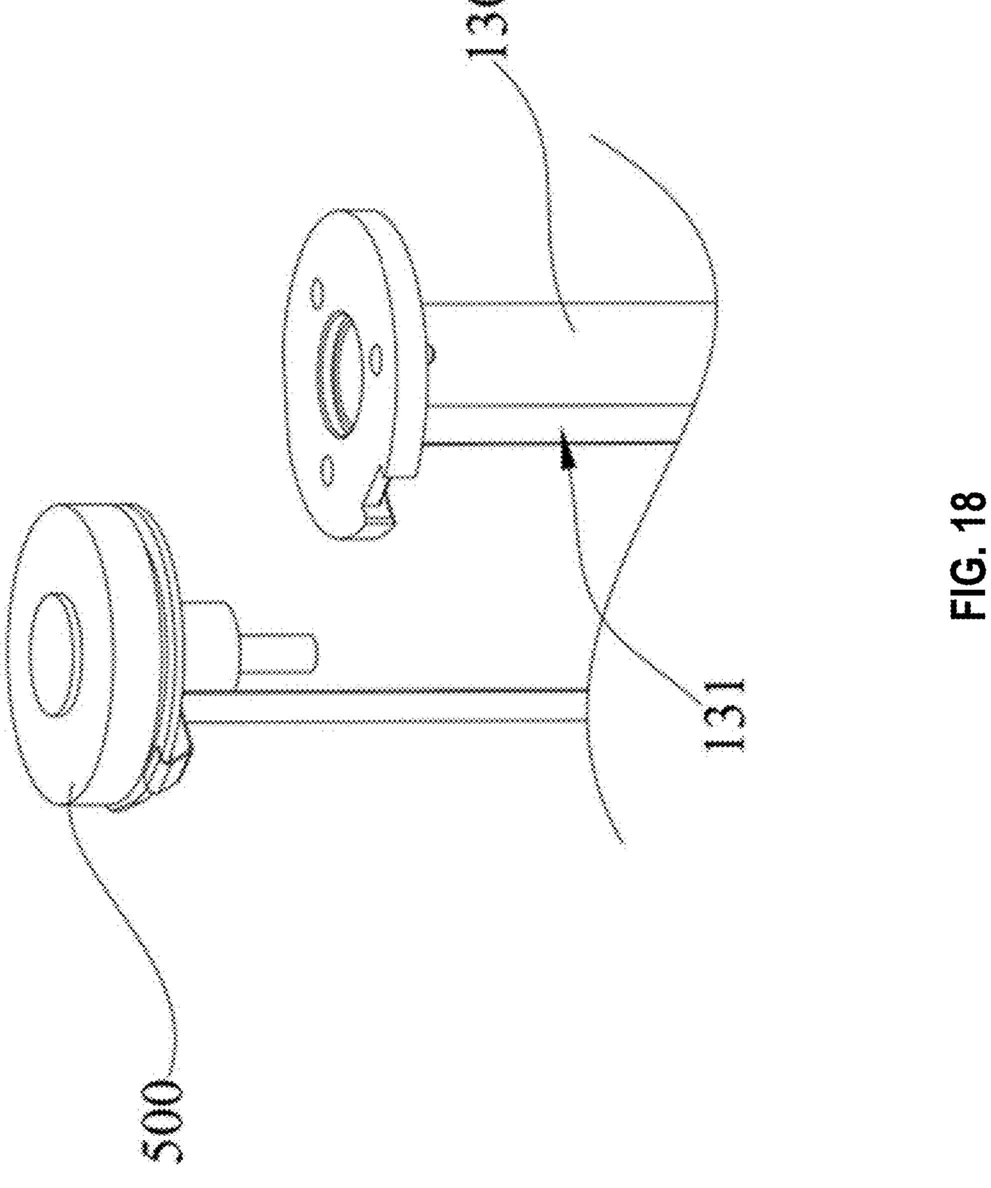
FIG. 18 is a schematic exploded diagram of a stationary shaft and a driving apparatus according to an embodiment of the present application.

When the LiDAR 10 is driven by the driving apparatus 500, in order to guide the current to the driving apparatus 500, it is necessary to connect the driving apparatus 500 with wires. The wires need to introduce current from the end portion of the supporting shaft 130 facing away from the second rotary part 200. That is, the wires need to extend along the length direction of the supporting shaft 130. In order not to clutter the wires, it is necessary to place the wires against the supporting shaft 130. As shown in FIGS. 6, 10 and 18, in some embodiments, the supporting shaft 130 includes a cut surface 131 extending along the axial direction thereof, and the cut surface 131 is a plane. In one aspect, the cut surface 131 can facilitate the positioning of the supporting shaft 130 such that the supporting shaft 130 can satisfactorily transmit the torque to the second rotary part 200; in another aspect, the wires connected to the driving apparatus 500 can also extend to fit the cut surface 131, so that the wires can closely fit to the supporting shaft 130, thereby facilitating the arrangement of the wires.

When the second rotary part 200 includes the rotary table 210 and the rotary table 210 is connected to the end portion of the supporting shaft 130 facing away from the first rotary part 100, the rotary table 210 may be connected to the aforementioned driving apparatus 500. In some embodiments, the rotary table 210 may be connected to a rotor of the driving apparatus 500, and the supporting shaft 130 may be connected to a stator of the driving apparatus 500. Since only the stator of the driving apparatus 500 generally needs to be connected to an electric device, the supporting shaft 130 is connected to the stator such that the second rotary part 200 and the rotary table 210 do not need to be electrically connected to the electric device.

In some embodiments, the stator of the driving apparatus 500 may be connected to the rotary table 210, and the rotor may be connected to the supporting shaft 130. When constructed as described above, in order to reduce the volume of the LiDAR 10, the interior of the rotary table 210 may be a hollow structure. For example, the rotary table 210 defines an internal cavity, the driving apparatus 500 is arranged in the internal cavity of the rotary table 210, and the rotary shaft of the rotor of the driving apparatus 500 extends out of the internal cavity of the rotary table 210 and is connected to the supporting shaft 130. The structure of the driving apparatus 500 arranged in the internal cavity of the rotary table 210 enables the driving apparatus 500 to occupy almost no additional space, thereby improving the space utilization of the LiDAR 10.

When the fixing structure is connected to the first rotary part 100, the fixing structure may be connected to the base of the first rotary part 100. In some embodiments, the base also includes a mounting surface 1111 connected to the supporting shaft 130. A central axis of the supporting shaft 130 may be arranged perpendicularly to the mounting surface 1111. The aforementioned laser transceiving assembly 300 is connected to the mounting surface 1111 of the base, so as to facilitate emitting of the emergent laser towards the reflector 410 and receiving of the reflected laser from the reflector 410.

In order to supply power to the laser transceiving assembly 300 connected to the base and transmit data detected by the laser transceiving assembly 300, the first rotary part 100 is further connected to the circuit board 140. In one aspect, the circuit board 140 has many members with a complex structure, and the surface capable of reflecting the light is uneven, which is likely to generate stray light, and the stray light is likely to mix with the reflected laser to affect the detection precision of the LiDAR 10. In another aspect, the laser transceiving assembly 300 has a higher temperature when the power is higher, and the circuit board 140 is easily damaged when used in an elevated temperature environment for a long time.

Figure 4:
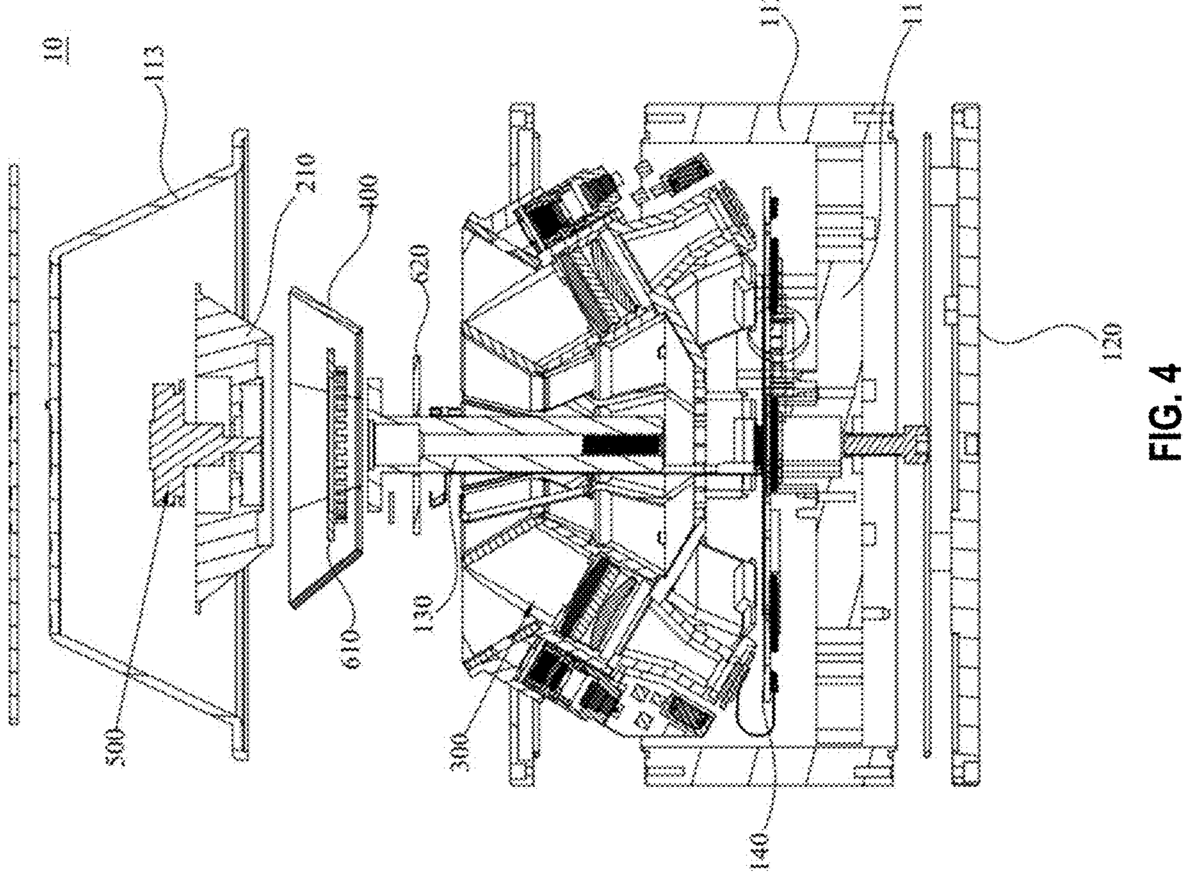
FIG. 4 is a schematic full-sectional diagram of a LiDAR according to an embodiment of the present application, where the LiDAR is shown exploded.
Figure 5:
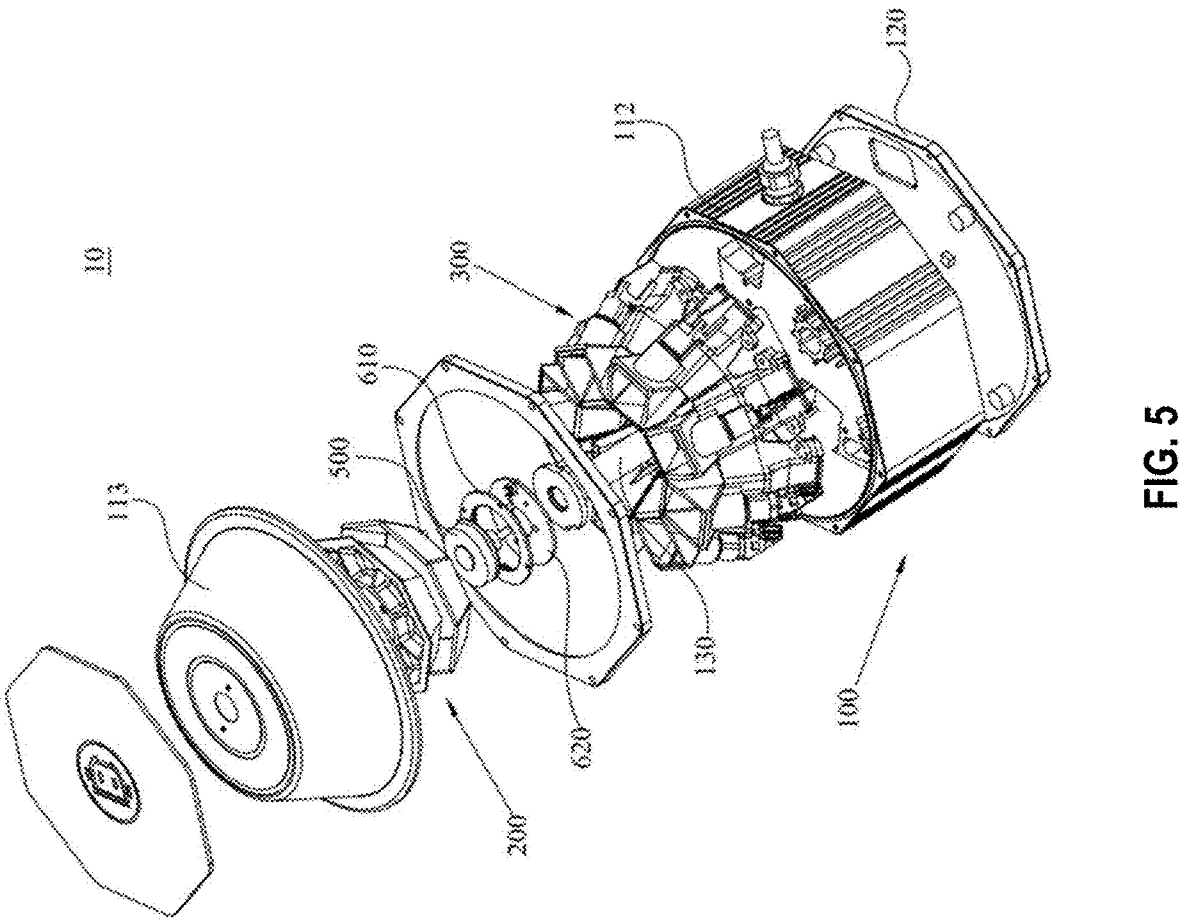
FIG. 5 is a first schematic exploded diagram of a LiDAR according to an embodiment of the present application.

In order to solve the above problem, as shown in FIGS. 3 to 4, in some embodiments, the second rotary part 200 may further include a bottom shell 120. The bottom shell 120 is connected to one side of the base facing away from the mounting surface 1111 and defines, together with the surface of the base facing away from the mounting surface 1111, a containing cavity. The containing cavity is configured to contain the circuit board 140 of the LiDAR 10, and the circuit board 140 is electrically connected with the laser transceiving assembly 300. In one aspect, the circuit board 140 and the laser transceiving assembly 300 are isolated by the base, so that the stray light emitted by the circuit board 140 does not affect the reflected laser beam, and the stray light entering the laser transceiving assembly 300 is reduced. In another aspect, as the circuit board 140 is not located in the same closed space with the laser transceiving assembly 300, the influence of the high temperature generated by the laser transceiving assembly 300 on the circuit board 140 is reduced, and the service life of the circuit board 140 is prolonged.

As shown in FIGS. 2 and 10, the base may include an outer shell 112 and a bottom plate 111. The outer shell 112 is arranged around the periphery of the bottom plate 111. One end of the outer shell 112, the bottom plate 111, and the bottom shell 120 jointly define the containing cavity for containing the circuit board 140. The other end of the outer shell 112 and one side of the bottom plate 111 having the mounting surface 1111 jointly define a cavity for containing the laser transceiving assembly 300. In order to guide the electric power on the circuit board 140 to the laser transceiving assembly 300, in some embodiments, a plurality of through holes 1112 are formed in the bottom plate 111 of the base, and the laser transceiving assembly 300 is electrically connected to the circuit board 140 through the through holes 1112.

Figure 11:
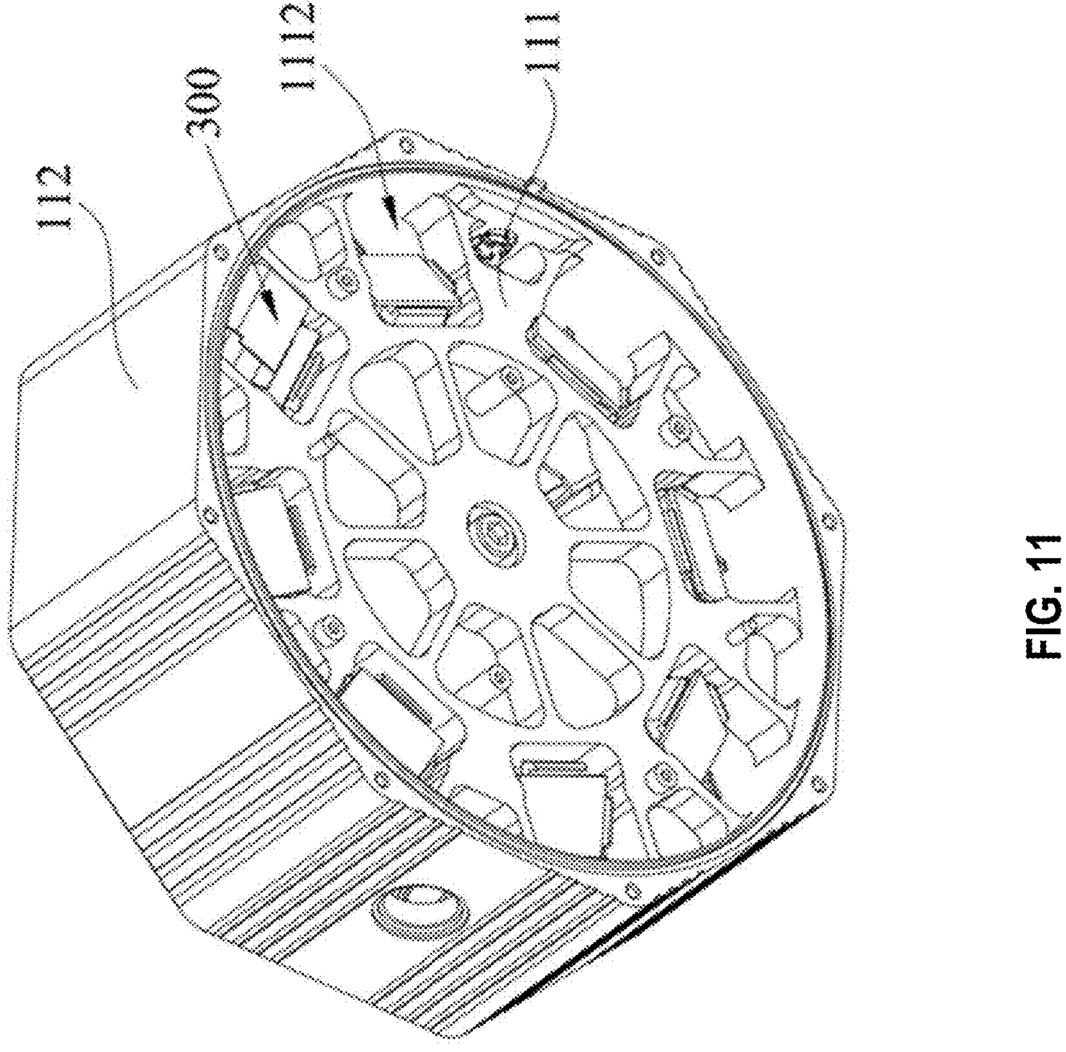
FIG. 11 is a schematic perspective diagram of a combination of a part of components of a first rotary part and laser transceiving assemblies according to an embodiment of the present application.
Figure 12:
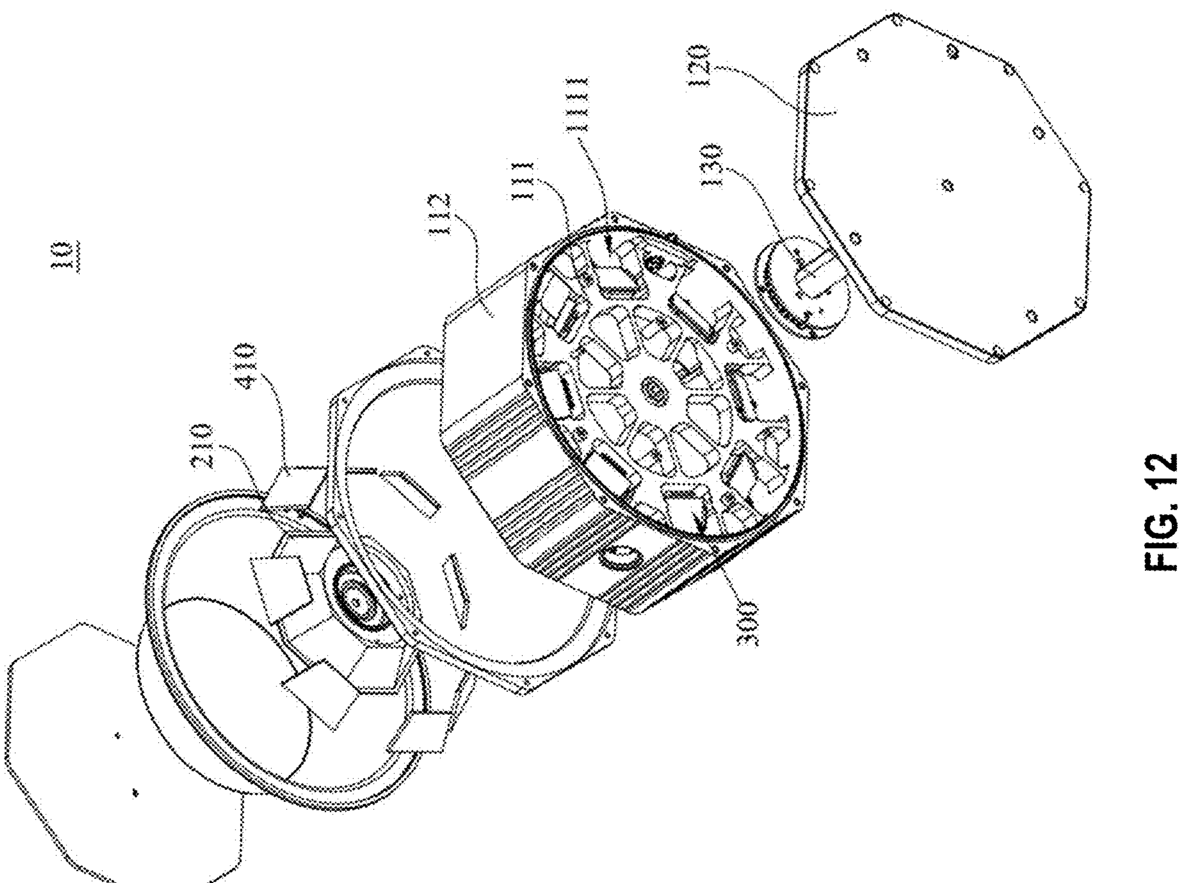
FIG. 12 is a schematic exploded diagram of a LiDAR according to an embodiment of the present application.
Figure 13:
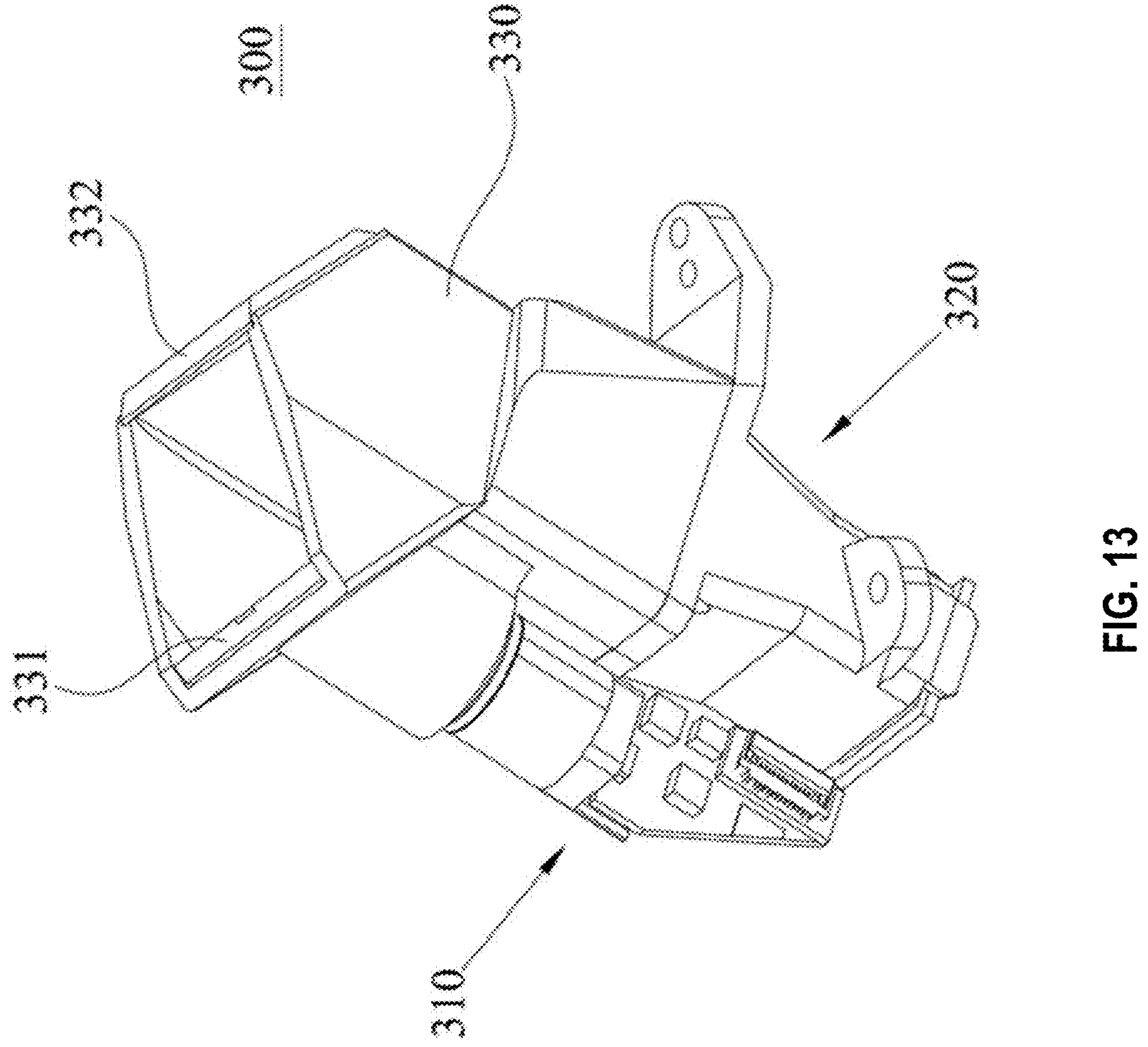
FIG. 13 is a schematic perspective diagram of a laser transceiving assembly according to an embodiment of the present application.

In order to enhance the sealing performance of the containing cavity as much as possible, as shown in FIGS. 11 to 12, in some embodiments, the end portion of each laser transceiving assembly 300 facing away from the reflector 410 passes through the through holes 1112 on the bottom shell 111 in a one-to-one correspondence manner. Therefore, in one aspect, the laser transceiving assemblies 300 are conveniently electrically connected to the circuit board 140; and in another aspect, each through hole 1112 is sealed by each laser transceiving assembly 300, so that the sealing performance of the containing cavity is improved.

In some embodiments, as shown in FIGS. 4 and 6, in order to monitor the rotation angle of the second rotary part 200 relative to the first rotary part 100, the LiDAR 10 also includes an angle measurement device. In some embodiments, the angle measurement device includes a code disc 610 and an optical component 620. The code disc 610 is connected to the second rotary part 200, and the code disc 610 includes code teeth arranged around the rotary axis 20. The optical component 620 is connected to the end portion of the supporting shaft 130 facing away from the first rotary part 100, and the optical component 620 is fitted to the code disc 610 for monitoring the number of code teeth swept over to monitor the rotation angle of the second rotary part 200 relative to the first rotary part 100.

In some embodiments, when the rotary table 210 is hollow inside, in order to reduce the volume of the LiDAR 10, the code disc 610 may be arranged inside the internal cavity of the rotary table 210, and the code teeth of the code disc 610 extend out of the internal cavity of the rotary table 210 to be fitted with the optical component 620.

Figure 21:
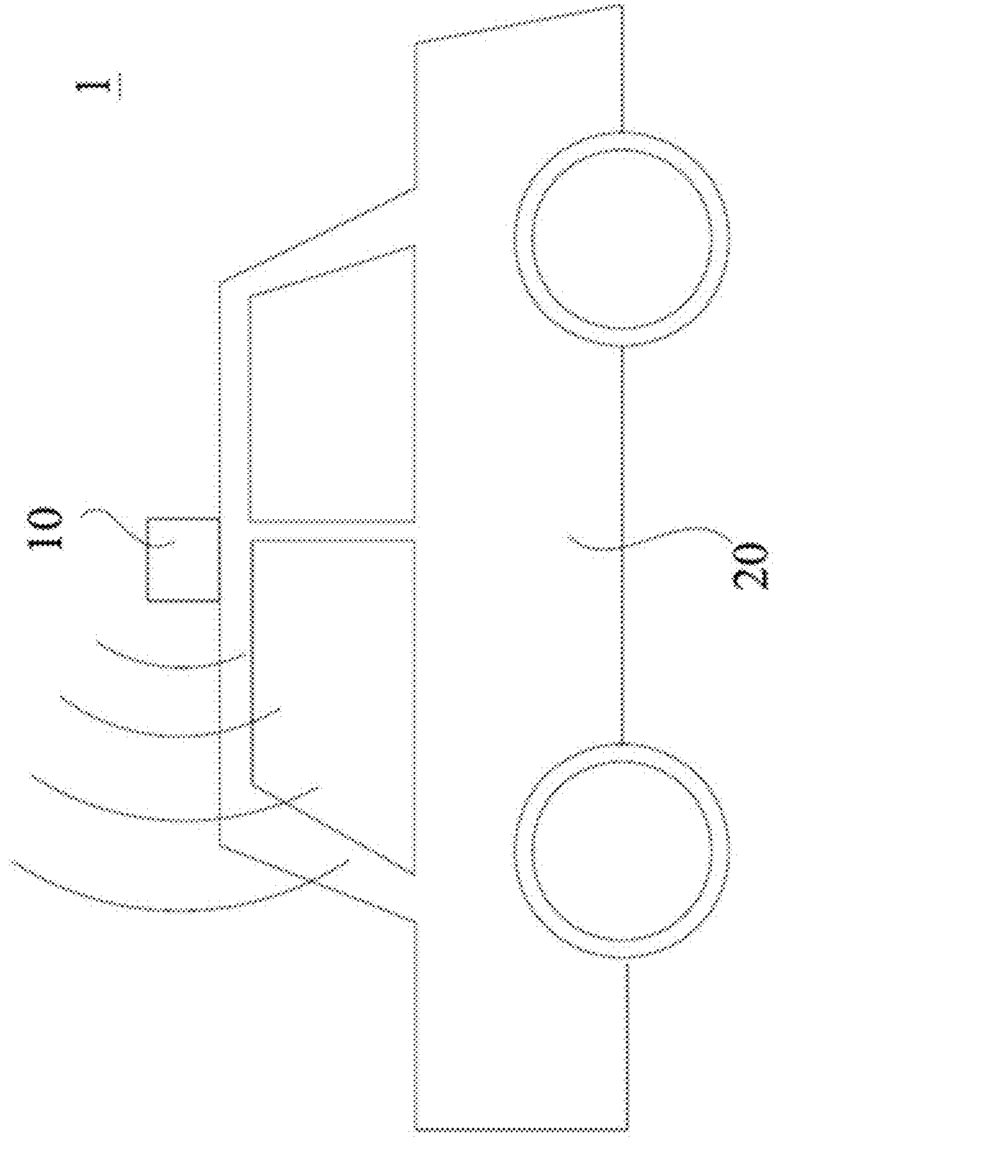
FIG. 21 is a schematic structural diagram of an autonomous driving vehicle according to an embodiment of the present application.
Figure 22:
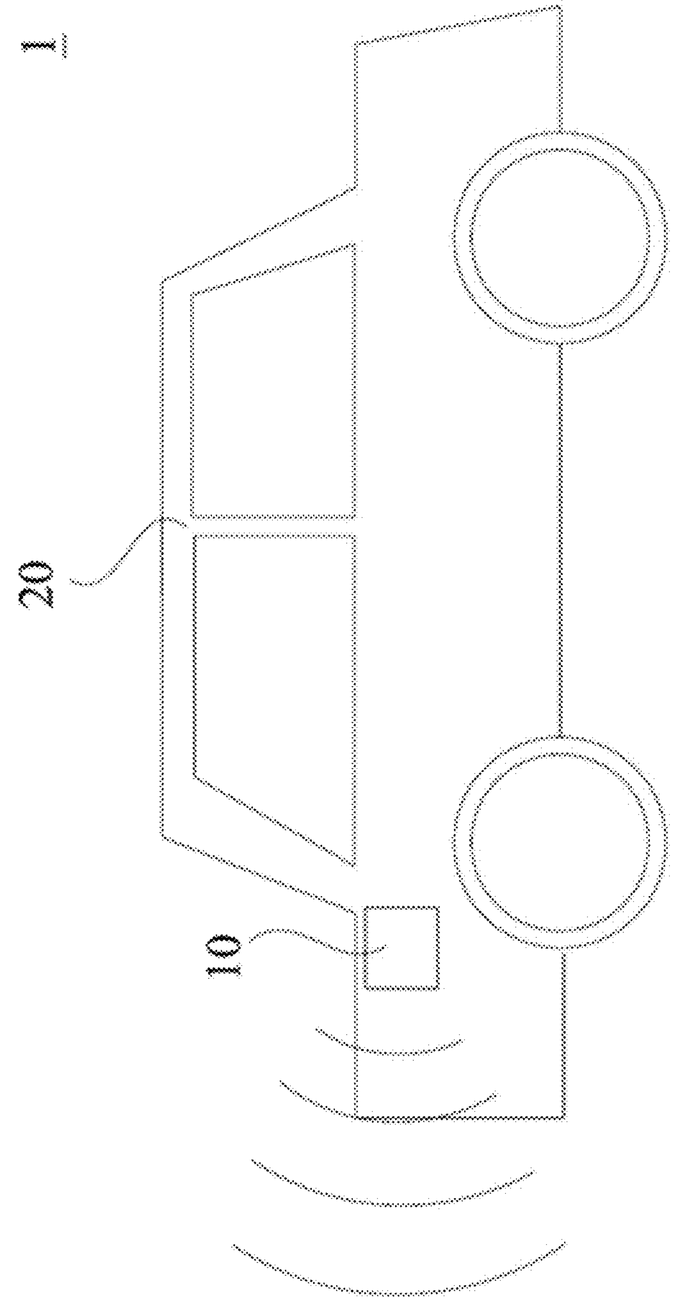
FIG. 22 is a schematic structural diagram of an autonomous driving vehicle according to another embodiment of the present application.

As shown in FIGS. 21 to 22, the second aspect of the embodiment of the present application also provides an autonomous driving vehicle 1, and the autonomous driving vehicle 1 includes the LiDAR 10 in any one of the embodiments described above. The device 1 may be any device 1 with laser detection, in particular an automobile. The automobile includes an automobile body 20, and the LiDAR 10 can be mounted outside the automobile body 20 or embedded in the automobile body 20. When the LiDAR 10 is arranged outside the automobile body 20, the LiDAR 10 is arranged on the roof of the automobile body 20.

The same or similar reference numerals in the drawings of the present embodiment correspond to the same or similar components. In the description of the present application, it should be understood that if there is an orientation or positional relationship indicated by the terms “upper”, “lower”, “left”, “right”, etc., based on the orientation or positional relationship shown in the drawings, it is only for the convenience of description of the present application and simplification of the description of the present application, but it is not intended to indicate or imply that the apparatus or member referred to must have a specific orientation, be constructed in a specific orientation and operate, and therefore the terms describing the positional relationship in the drawings are only used for illustrative purposes and are not to be construed as limiting the present patent, and the specific meaning of the above terms can be understood according to the specific situation by those skilled in the art.

The above mentioned contents are only embodiments of the present application and are not intended to limit the present application. Any modification, equivalent substitution, improvement, etc., made within the spirit and principle of the present application shall all fall within the scope of protection of the present application.

What is claimed is:

1. A LiDAR, comprising:

a rotary device, comprising a first rotary part and a second rotary part, wherein the first rotary part and the second rotary part are configured to rotate relative to each other around a rotary axis;

a laser transceiving assembly, connected to the first rotary part and configured to emit an emergent laser beam and receive a reflected laser beam, wherein the reflected laser beam is a laser beam reflected back after the emergent laser beam irradiating an object to be detected; and a reflecting assembly, connected to the second rotary part and comprising at least two reflectors, wherein the at least two reflectors are arranged around the rotary axis, and among included angles between the at least two reflectors and a plane perpendicular to the rotary axis, at least two are different;

wherein in a motion of the laser transceiving assembly rotating along with the first rotary part relative to the second rotary part, each reflector is configured to reflect the emergent laser beam emitted by the laser transceiving assembly to the object and reflect the reflected laser beam reflected back by the object to the corresponding laser transceiving assembly;

wherein a fixing structure is arranged on the first rotary part and is configured to fix the LiDAR; and wherein the first rotary part comprises:

a base, wherein the fixing structure is arranged on the base, the base comprises a mounting surface, and the laser transceiving assembly is mounted on the mounting surface; and a supporting shaft, wherein the supporting shaft is connected to the mounting surface, a central axis of the supporting shaft is perpendicular to the mounting surface, the second rotary part is connected to an end portion of the supporting shaft facing away from the first rotary part, and the rotary axis is parallel to or coincident with the central axis of the supporting shaft, wherein an included angle $\theta$ between an optical axis of each laser transceiving assembly and each reflector has the following value range: $0° < \theta < 90°$.

2. The LiDAR according to claim 1, wherein every two adjacent reflectors are connected to each other along a circumferential direction around the rotary axis.

3. The LiDAR according to claim 2, wherein the second rotary part has a rotation motion rotating relative to the first rotary part, and a rotation stroke is 360 degrees.

4. The LiDAR according to claim 3, wherein a number of the reflectors is at least three, and the reflectors are connected to each other to form an annular reflector set.

5. The LiDAR according to claim 4, wherein the included angles between the at least two reflectors and the plane perpendicular to the rotary axis are all different.

6. The LiDAR according to claim 4, wherein the reflectors comprise an initial reflector and an end reflector adjacent to the initial reflector, and included angles between the reflectors and the plane perpendicular to the rotary axis gradually increase from the initial reflector to the end reflector along the circumferential direction around the rotary axis.

7. The LiDAR according to claim 6, wherein included angles are equal between every two adjacent reflectors from the initial reflector to the end reflector along the circumferential direction around the rotary axis.

8. The LiDAR according to claim 4, wherein the LiDAR comprises a plurality of the laser transceiving assemblies, and the plurality of the laser transceiving assemblies are arranged around the rotary axis; and in the rotation motion of the second rotary part, the emergent laser beam emitted by each laser transceiving assembly is reflected by at least one of the reflectors, and at least one of the reflected laser beams reflected back by the reflectors is received by each laser transceiving assembly.

9. The LiDAR according to claim 8, wherein the number of the laser transceiving assemblies is the same as the number of the reflectors, and in the rotation motion of the second rotary part, each reflector correspondingly reflects one of the emergent laser beams of the laser transceiving assemblies, and reflects one of the reflected laser beams to the corresponding laser transceiving assembly.

10. The LiDAR according to claim 1, wherein a minimum value of the included angles between the reflectors and the rotary axis is greater than 0 degrees, and a maximum value of the included angles between the reflectors and the rotary axis is less than 90 degrees.

11. The LiDAR according to claim 1, wherein the second rotary part further comprises:

a bottom shell, wherein the bottom shell is connected to the base, and defines, together with a surface of the base facing away from the mounting surface, a containing cavity, the containing cavity is configured to contain a circuit board of the LiDAR, and the circuit board is electrically connected with the laser transceiving assembly.

12. The LiDAR according to claim 11, wherein the base comprises an outer shell and a bottom plate, wherein the outer shell is arranged around a periphery of the bottom plate, wherein the outer shell, the bottom plate, and the bottom shell jointly define the containing cavity; and the bottom plate comprises the mounting surface, wherein a through hole penetrating through the bottom plate is formed in the mounting surface, and the laser transceiving assembly is electrically connected with the circuit board through the through hole.

13. The LiDAR according to claim 12, wherein the LiDAR comprises a plurality of the laser transceiving assemblies arranged around the rotary axis;

a plurality of the through holes are formed in the bottom plate; and each laser transceiving assembly is electrically connected with the circuit board through the through holes in a one-to-one correspondence manner.

14. The LiDAR according to claim 1, wherein the second rotary part comprises a rotary table, wherein the rotary table is connected to an end portion of the supporting shaft facing away from the base; and the rotary table comprises a reflecting surface, wherein the reflecting surface is connected to the reflectors.

15. The LiDAR according to claim 14, wherein the rotary table comprises a plurality of the reflecting surfaces arranged around the supporting shaft; and the reflecting assembly comprises a plurality of the reflectors, wherein each reflector is connected to each reflecting surface in a one-to-one correspondence manner.

16. The LiDAR according to claim 1, further comprising:

a driving apparatus, connected to the first rotary part and the second rotary part, and configured to drive the second rotary part to rotate around the rotary axis relative to the first rotary part.

17. An autonomous driving vehicle, comprising the LiDAR according to claim 1.

* * * * *